(12) United States Patent
Suresh et al.

(10) Patent No.: US 12,368,618 B2
(45) Date of Patent: Jul. 22, 2025

(54) TECHNIQUES FOR CYCLIC PREFIX COMPATIBLE FORMULATION OF SINGLE CARRIER WAVEFORMS

(71) Applicant: QUALCOMM Incorporated, San Diego, CA (US)

(72) Inventors: Vinayak Suresh, San Diego, CA (US); Seyedkianoush Hosseini, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 18/145,008

(22) Filed: Dec. 21, 2022

(65) Prior Publication Data

US 2024/0214249 A1 Jun. 27, 2024

(51) Int. Cl.
*H04L 27/148* (2006.01)
*H04L 27/26* (2006.01)

(52) U.S. Cl.
CPC ........ *H04L 27/148* (2013.01); *H04L 27/2605* (2013.01); *H04L 27/2636* (2013.01)

(58) Field of Classification Search
CPC ............... H04L 27/148; H04L 27/2605; H04L 27/2636
See application file for complete search history.

(56) References Cited

U.S. PATENT DOCUMENTS

| | | |
|---|---|---|
| 2016/0105891 A1 | 4/2016 | Li et al. |
| 2016/0182270 A1 | 6/2016 | Jungnickel et al. |
| 2022/0271983 A1 | 8/2022 | Ma et al. |

OTHER PUBLICATIONS

International Search Report and Written Opinion—PCT/US2023/080474—ISA/EPO—Mar. 18, 2024.

*Primary Examiner* — Samina F Choudhry
(74) *Attorney, Agent, or Firm* — Holland & Hart LLP

(57) ABSTRACT

Methods, systems, and devices for wireless communications are described. Techniques described herein provide for formulating single carrier waveforms into an orthogonal frequency-division multiple access (OFDMA) framework. To fit into the cyclic prefix OFDM (CP-OFDM) grid, a frequency domain fast Fourier transform (FFT) may be applied to the single carrier waveform, a bandwidth expansion and spectrum shaping may be applied to the output of the FFT and inverse FFT (IFFT) processing may be applied to the output of the bandwidth expansion and spectrum shaping. The output of the IFFT may then be represented in an OFDM compatible manner.

32 Claims, 12 Drawing Sheets

$$b(t) = \sum_k s_k \cdot f(\tau - kT_s)d\tau$$

```
┌─────────────────────────────────────────┐
│ Communicating, with a first wireless device, control
│ signal indicating a single carrier waveform configuration
│ associated with a transmission, the single carrier
│ waveform configuration indicating a set of parameters
│ including at least one of a single carrier waveform type, a
│ bandwidth expansion factor, a frequency shaping filter, a
│ quantity of symbols, and a quantity of subcarriers, the
│ single carrier waveform type comprising one of a single
│ carrier quadrature amplitude modulation waveform type,
│ a minimum shift keying waveform type, a Gaussian
│ minimum shift keying waveform type, or a continuous
│ phase modulation waveform type
└─────────────────────────────────────────┘ ⟶ 1205
                    ↓
┌─────────────────────────────────────────┐
│ Receive, from the first wireless device via the quantity of
│ symbols and the quantity of subcarriers, the transmission
│ including a waveform
└─────────────────────────────────────────┘ ⟶ 1210
                    ↓
┌─────────────────────────────────────────┐
│ Decode the waveform in accordance with the bandwidth
│ expansion factor and the frequency shaping filter to
│ identify a set of data samples associated with the single
│ carrier waveform type
└─────────────────────────────────────────┘ ⟶ 1215
```

TECHNIQUES FOR CYCLIC PREFIX COMPATIBLE FORMULATION OF SINGLE CARRIER WAVEFORMS

FIELD OF TECHNOLOGY

The following relates to wireless communications, including techniques for cyclic prefix compatible formulation of single carrier waveforms.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-s-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for cyclic prefix (CP) compatible formulation of single carrier waveforms. For example, the described techniques provide for formulating single carrier waveforms into an orthogonal frequency-division multiple access (OFDMA) framework. To fit into the CP-OFDM grid, a frequency domain fast Fourier transform (FFT) may be applied to the single carrier waveform, bandwidth expansion and spectrum shaping may be applied to the output of the FFT, and inverse fast Fourier transform (IFFT) processing may be applied to the output of the bandwidth expansion and spectrum shaping. The output of the IFFT may then be represented in an OFDM compatible manner.

A method for wireless communications at a first wireless device is described. The method may include communicating, with a second wireless device, control signaling indicating a single carrier waveform configuration associated with a transmission, the single carrier waveform configuration indicating a set of parameters including at least one of a single carrier waveform type, a bandwidth expansion factor, a frequency shaping filter, a quantity of symbols, and a quantity of subcarriers, performing a FFT on a set of data samples associated with the single carrier waveform type to generate a first output, a size of the FFT associated with the quantity of symbols, the single carrier waveform type including one of a waveform type, a minimum shift keying (MSK) waveform type, a Gaussian minimum shift keying (GMSK) waveform type, or a continuous phase modulation (CPM) waveform type, performing bandwidth expansion in accordance with the bandwidth expansion factor and a spectrum shaping in accordance with the frequency shaping filter on the first output of the FFT to generate a second output, performing an IFFT on the second output to generate a waveform, a size of the IFFT associated with the quantity of subcarriers, and transmitting, to the second wireless device, the transmission including the generated waveform.

An apparatus for wireless communications at a first wireless device is described. The apparatus may include a processor, memory coupled with the processor, and instructions stored in the memory. The instructions may be executable by the processor to cause the apparatus to communicating, with a second wireless device, control signal indicating a single carrier waveform configuration associated with a transmission, the single carrier waveform configuration indicating a set of parameters including at least one of a single carrier waveform type, a bandwidth expansion factor, a frequency shaping filter, a quantity of symbols, and a quantity of subcarriers, perform a FFT on a set of data samples associated with the single carrier waveform type to generate a first output, a size of the FFT associated with the quantity of symbols, the single carrier waveform type including one of a SC-QAM waveform type, a MSK waveform type, a GMSK waveform type, or a CPM (CPM) waveform type, perform bandwidth expansion in accordance with the bandwidth expansion factor and a spectrum shaping in accordance with the frequency shaping filter on the first output of the FFT to generate a second output, perform an IFFT on the second output to generate a waveform, a size of the IFFT associated with the quantity of subcarriers, and transmit, to the second wireless device, the transmission including the generated waveform.

Another apparatus for wireless communications at a first wireless device is described. The apparatus may include means for communicating, with a second wireless device, control signaling indicating a single carrier waveform configuration associated with a transmission, the single carrier waveform configuration indicating a set of parameters including at least one of a single carrier waveform type, a bandwidth expansion factor, a frequency shaping filter, a quantity of symbols, and a quantity of subcarriers, means for performing a FFT on a set of data samples associated with the single carrier waveform type to generate a first output, a size of the FFT associated with the quantity of symbols, the single carrier waveform type including one of a SC-QAM waveform type, a MSK waveform type, a GMSK waveform type, or a CPM waveform type, means for performing bandwidth expansion in accordance with the bandwidth expansion factor and a spectrum shaping in accordance with the frequency shaping filter on the first output of the FFT to generate a second output, means for performing an IFFT on the second output to generate a waveform, a size of the IFFT associated with the quantity of subcarriers, and means for transmitting, to the second wireless device, the transmission including the generated waveform.

A non-transitory computer-readable medium storing code for wireless communications at a first wireless device is described. The code may include instructions executable by a processor to communicating, with a second wireless device, control signal indicating a single carrier waveform configuration associated with a transmission, the single carrier waveform configuration indicating a set of parameters including at least one of a single carrier waveform type, a bandwidth expansion factor, a frequency shaping filter, a quantity of symbols, and a quantity of subcarriers, perform a FFT on a set of data samples associated with the single carrier waveform type to generate a first output, a size of the FFT associated with the quantity of symbols, the single carrier waveform type including one of a single carrier quadrature amplitude modulation (SC-QAM) waveform type, a MSK waveform type, a GMSK waveform type, or a CPM waveform type, perform bandwidth expansion in accordance with the bandwidth expansion factor and a spectrum shaping in accordance with the frequency shaping filter on the first output of the FFT to generate a second output, perform an IFFT on the second output to generate a waveform, a size of the IFFT associated with the quantity of subcarriers, and transmit, to the second wireless device, the transmission including the generated waveform.

In some examples of the method, apparatuses, and non-transitory computer-readable medium described herein, communicating, with the second wireless device, control information indicating a cyclic prefix (CP) length, a subcarrier spacing, a symbol length in time and a sampling rate associated with the transmission, where the waveform may be generated in accordance with the CP length, the subcarrier spacing, the symbol length and the sampling rate.

In some examples of the method, apparatuses, and non-transitory computer-readable medium described herein, communicating the control information may include operations, features, means, or instructions for communicating second control signaling indicating the CP length, the subcarrier spacing, and the sampling rate may be associated with a bandwidth part or a component carrier, where the transmission may be associated with the bandwidth part or the component carrier.

In some examples of the method, apparatuses, and non-transitory computer-readable medium described herein, communicating the control information may include operations, features, means, or instructions for communicating the control information in a same control message as the control signaling indicating the single carrier waveform configuration.

Some examples of the method, apparatuses, and non-transitory computer-readable medium described herein may further include operations, features, means, or instructions for appending a CP having the CP length to each symbol of a third output of the IFFT to generate the waveform.

In some examples of the method, apparatuses, and non-transitory computer-readable medium described herein, communicating the control signaling may include operations, features, means, or instructions for communicating an indication of the single carrier waveform type from a set of single carrier waveform types, where the bandwidth expansion factor and the frequency shaping filter may be based on the single carrier waveform type.

In some examples of the method, apparatuses, and non-transitory computer-readable medium described herein, the set of single carrier waveform types includes two or more of a SC-QAM waveform type, the SC-QAM waveform type, the MSK waveform type, the GMSK waveform type, or the CPM waveform type.

Some examples of the method, apparatuses, and non-transitory computer-readable medium described herein may further include operations, features, means, or instructions for generating the set of data samples via performing differential encoding on a data stream in accordance with a memory parameter, a modulation index parameter and a modulation order parameter, where the single carrier waveform type includes the CPM waveform type, where the waveform configuration indicates the memory parameter, the modulation index parameter and the modulation order parameter.

In some examples of the method, apparatuses, and non-transitory computer-readable medium described herein, communicating the control signaling may include operations, features, means, or instructions for receiving the control signaling, where the first wireless device may be a user equipment (UE) and the second wireless device may be a network entity.

In some examples of the method, apparatuses, and non-transitory computer-readable medium described herein, communicating the control signaling may include operations, features, means, or instructions for transmitting the control signaling, where the first wireless device may be a network entity and the second wireless device may be a UE.

A method for wireless communications at a second wireless device is described. The method may include communicating, with a first wireless device, control signaling indicating a single carrier waveform configuration associated with a transmission, the single carrier waveform configuration indicating a set of parameters including at least one of a bandwidth expansion factor, a frequency shaping filter, a quantity of symbols, and a quantity of subcarriers, the single carrier waveform type including one of a SC-QAM waveform type, a MSK waveform type, a GMSK waveform type, or a CPM waveform type, receiving, from the first wireless device via the quantity of symbols and the quantity of subcarriers, the transmission including a waveform, and decoding the waveform in accordance with the bandwidth expansion factor and the frequency shaping filter to identify a set of data samples associated with the single carrier waveform type.

An apparatus for wireless communications at a second wireless device is described. The apparatus may include a processor, memory coupled with the processor, and instructions stored in the memory. The instructions may be executable by the processor to cause the apparatus to communicating, with a first wireless device, control signal indicating a single carrier waveform configuration associated with a transmission, the single carrier waveform configuration indicating a set of parameters including at least one of a bandwidth expansion factor, a frequency shaping filter, a quantity of symbols, and a quantity of subcarriers, the single carrier waveform type including one of a SC-QAM waveform type, a MSK waveform type, a GMSK waveform type, or a CPM waveform type, receive, from the first wireless device via the quantity of symbols and the quantity of subcarriers, the transmission including a waveform, and decode the waveform in accordance with the bandwidth expansion factor and the frequency shaping filter to identify a set of data samples associated with the single carrier waveform type.

Another apparatus for wireless communications at a second wireless device is described. The apparatus may include means for communicating, with a first wireless device, control signaling indicating a single carrier waveform configuration associated with a transmission, the single carrier waveform configuration indicating a set of parameters including at least one of a bandwidth expansion factor, a frequency shaping filter, a quantity of symbols, and a quantity of subcarriers, the single carrier waveform type including one of a SC-QAM waveform type, a MSK waveform type, a GMSK waveform type, or a CPM waveform type, means for receiving, from the first wireless device via the quantity of symbols and the quantity of subcarriers, the transmission including a waveform, and means for decoding the waveform in accordance with the bandwidth expansion factor and the frequency shaping filter to identify a set of data samples associated with the single carrier waveform type.

A non-transitory computer-readable medium storing code for wireless communications at a second wireless device is described. The code may include instructions executable by a processor to communicating, with a first wireless device, control signal indicating a single carrier waveform configuration associated with a transmission, the single carrier waveform configuration indicating a set of parameters including at least one of a bandwidth expansion factor, a frequency shaping filter, a quantity of symbols, and a quantity of subcarriers, the single carrier waveform type including one of a SC-QAM waveform type, a MSK waveform type, a GMSK waveform type, or a CPM waveform type, receive, from the first wireless device via the quantity of symbols and the quantity of subcarriers, the transmission including a waveform, and decode the waveform in accordance with the bandwidth expansion factor and the frequency shaping filter to identify a set of data samples associated with the single carrier waveform type.

In some examples of the method, apparatuses, and non-transitory computer-readable medium described herein, communicating, with the first wireless device, control information indicating a CP length, a subcarrier spacing, a symbol length in time and a sampling rate associated with the transmission, where decoding the waveform includes decoding the waveform in accordance with the CP length, the subcarrier spacing, the symbol length and the sampling rate.

In some examples of the method, apparatuses, and non-transitory computer-readable medium described herein, communicating the control information may include operations, features, means, or instructions for communicating second control signaling indicating the CP length, the subcarrier spacing, and the sampling rate may be associated with a bandwidth part or a component carrier, where the transmission may be associated with the bandwidth part or the component carrier.

In some examples of the method, apparatuses, and non-transitory computer-readable medium described herein, communicating the control information may include operations, features, means, or instructions for communicating the control information in a same control message as the control signaling indicating the single carrier waveform configuration.

In some examples of the method, apparatuses, and non-transitory computer-readable medium described herein, decoding the waveform in accordance with the CP length may include operations, features, means, or instructions for removing a CP having the CP length from each symbol of the waveform.

In some examples of the method, apparatuses, and non-transitory computer-readable medium described herein, communicating the control signaling may include operations, features, means, or instructions for communicating an indication of the single carrier waveform type from a set of single carrier waveform types, where the bandwidth expansion factor and the frequency shaping filter may be based on the single carrier waveform type.

In some examples of the method, apparatuses, and non-transitory computer-readable medium described herein, the set of single carrier waveform types includes two or more of a discrete Fourier transform spread orthogonal frequency division multiplexing (DFT-s-OFDM) waveform type, the SC-QAM waveform type, the MSK waveform type, the GMSK waveform type, or the CPM waveform type.

In some examples of the method, apparatuses, and non-transitory computer-readable medium described herein, decoding the waveform to identify the set of data samples may include operations, features, means, or instructions for decoding the waveform in accordance with a memory parameter and a modulation order parameter, where the single carrier waveform type includes the CPM waveform type, where the single carrier waveform configuration indicates the memory parameter and the modulation order parameter.

In some examples of the method, apparatuses, and non-transitory computer-readable medium described herein, communicating the control signaling may include operations, features, means, or instructions for transmitting the control signaling, where the first wireless device may be a UE and the second wireless device may be a network entity.

In some examples of the method, apparatuses, and non-transitory computer-readable medium described herein, communicating the control signaling may include operations, features, means, or instructions for receiving the control signaling, where the first wireless device may be a network entity and the second wireless device may be a UE.

BRIEF DESCRIPTION OF THE DRAWINGS

FIGS. 11 and 12 illustrate flowcharts showing methods that support techniques for CP compatible formulation of single carrier waveforms in accordance with one or more aspects of the present disclosure.

DETAILED DESCRIPTION

Figure 1:
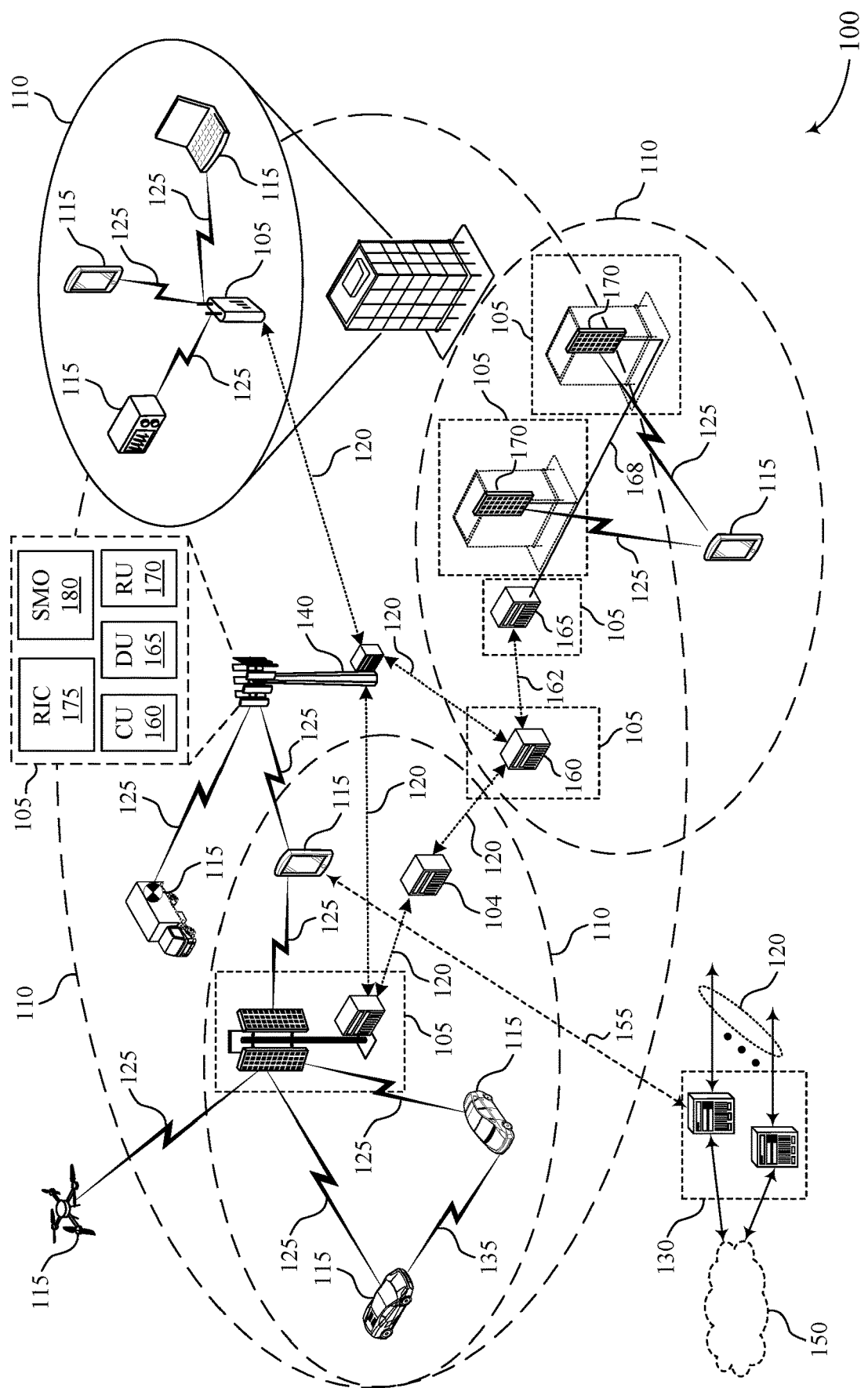
FIG. 1 illustrates an example of a wireless communications system that supports techniques for cyclic prefix (CP) compatible formulation of single carrier waveforms in accordance with one or more aspects of the present disclosure.

Waveform design for wireless communication may involve trade-offs between factors such as spectrum efficiency, peak to average power ratio (PAPR), multi-input multi-output (MIMO) support, and multiplexing flexibility. For example, for some applications such as enhanced mobile broadband (eMBB), multi-carrier waveforms may be preferable as they provide high spectral efficiency and support MIMO. In low power internet of things (IoT) devices and in regimes such as satellite uplink, low PAPR may be preferred and spectral efficiency may be less important, and therefore single carrier waveforms may be preferable. Currently, single carrier waveforms may not be represented on an orthogonal frequency division multiplexing (OFDM) grid, and accordingly, OFDM waveforms may not be multiplexed. Example single carrier waveforms may include single carrier quadrature amplitude modulation (SC-QAM) waveforms and continuous phase modulation (CPM) waveforms such as minimum shift keying (MSK) waveforms and Gaussian minimum shift keying (GMSK) waveforms. From the network perspective, as different waveforms may be suitable for different use cases, the inability to represent single carrier waveforms on the OFDM grid may mean that different single carrier waveforms may not be multiplexed with cyclic prefix (CP) OFDM waveforms.

Single carrier waveforms may be formulated into the OFDMA framework using frequency domain fast Fourier transform (FFT) and inverse FFT (IFFT) processing that fits into the CP-OFDM grid. For M quantity of modulation symbols and N quantity of subcarriers, a transmitter may apply an M-point FFT to the single carrier waveform, may apply bandwidth expansion and spectrum shaping to the output of the FFT, and may apply an N point IFFT to the output of the bandwidth expansion and spectrum shaping. For some single carrier waveforms, such as MSK, GMSK and CPM, the transmitter may also apply differential encoding. The output of the N Point IFFT may then be represented in an OFDM compatible manner. The differential encoding type, bandwidth expansion factor and spectrum shaping filter may depend on the type of single carrier waveform. Accordingly, the transmitter may communicate the differential encoding type, the bandwidth expansion factor and spectrum shaping filter to a receiver, and accordingly, and the receiver may decode the single carrier waveform represented in the OFDM compatible manner using the differential encoding type, the bandwidth expansion factor and spectrum shaping filter. Parameters such as the CP length, sampling rate, a symbol length in time and numerology (e.g., subcarrier spacing (SCS)) may be selected to enable multiplexing of the single carrier waveform represented in the OFDM compatible manner on a same CP-OFDM grid as other CP-OFDM waveforms or other single carrier waveforms represented in the OFDM compatible manner.

Formulating and representing waveforms on the same CP-OFDM grid or OFDM grid may enable in-band orthogonal multiplexing of single carrier waveforms, may enable unified generation of waveforms using similar FFT and IFFT based processing and may enable use of existing blocks for waveform generation and processing. Additionally, formulating and representing waveforms on the same CP-OFDM grid or OFDM grid may enable multiplexing of multiple types of waveforms with each waveform type optimized for a use case. For example, one waveform type may be designed to support eMBB applications and another waveform may be designed to support IoT applications.

Aspects of the disclosure are initially described in the context of wireless communications systems. Additional aspects of the disclosure are described in the context of wireless communications systems, an example sampling diagram, an example waveform diagram, and an example process flow. Aspects of the disclosure are further illustrated by and described with reference to apparatus diagrams, system diagrams, and flowcharts that relate to techniques for CP compatible formulation of single carrier waveforms.

FIG. 1 illustrates an example of a wireless communications system 100 that supports techniques for CP compatible formulation of single carrier waveforms in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for CP compatible formulation of single carrier waveforms as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as OFDM or discrete Fourier transform spread OFDM (DFT-s-OFDM)). In a system employing MCM techniques, a resource element may refer to resources of one symbol period (e.g., a duration of one modulation symbol) and one subcarrier, in which case the symbol period and SCS may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include an SCS ($\Delta f$) and a CP. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported SCS, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on SCS. Each slot may include a quantity of symbol periods (e.g., depending on the length of the CP prepended to each symbol period). In some wireless communications systems 100, a slot may further be divided into multiple mini-slots associated with one or more symbols. Excluding the CP, each symbol period may be associated with one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Waveform design for wireless communication may involve trade-offs between factors such as spectrum efficiency, PAPR, MIMO support, and multiplexing flexibility. For example, for some applications such as eMBB, multi-carrier waveforms may be preferable as they provide high spectral efficiency and support MIMO. In low power IoT devices and in regimes such as satellite uplink, low PAPR may be preferred and spectral efficiency may be less important, and therefor single carrier waveforms may be preferable. Currently, single carrier waveforms may not be represented on an OFDM grid, and accordingly, OFDM waveforms may not be multiplexed. Example single carrier waveforms may include SC-QAM and CPM such as MSK waveforms and GMSK waveforms. From the network perspective (e.g., from the perspective of a network entity 105), as different waveforms may be suitable for different use cases, the inability to represent single carrier waveforms on the OFDM grid may mean that different single carrier waveforms may not be multiplexed with CP OFDM waveforms.

Single carrier waveforms may be formulated into the OFDMA framework using frequency domain FFT and IFFT processing that fits into the CP OFDM grid. For M quantity of modulation symbols and N quantity of subcarriers, a transmitter may apply an M-point FFT to the single carrier waveform, may apply bandwidth expansion and spectrum shaping to the output of the FFT, and may apply an N point IFFT to the output of the bandwidth expansion and spectrum shaping. For some single carrier waveforms, such as MSK, GMSK and CPM, the transmitter may also apply differential encoding. The output of the N Point IFFT may then be represented in an OFDM compatible manner. The differential encoding type, the bandwidth expansion factor and spectrum shaping filter may depend on the type of single carrier waveform. Accordingly, the transmitter (e.g., a network entity 105 in downlink or a UE 115 in uplink or sidelink) may communicate the differential encoding type, the bandwidth expansion factor and spectrum shaping filter to a receiver (e.g., a network entity 105 in uplink, or a UE 115 in downlink or sidelink) and accordingly, and the receiver may decode the single carrier waveform represented in the OFDM compatible manner using the differential encoding type, the bandwidth expansion factor and spectrum shaping filter. Parameters such as the CP length, sampling rate, and numerology (e.g., SCS) may be selected to enable multiplexing of the single carrier waveform represented in the OFDM compatible manner on a same CP-OFDM grid as other CP-OFDM waveforms or other single carrier waveforms represented in the OFDM compatible manner.

Figure 2:
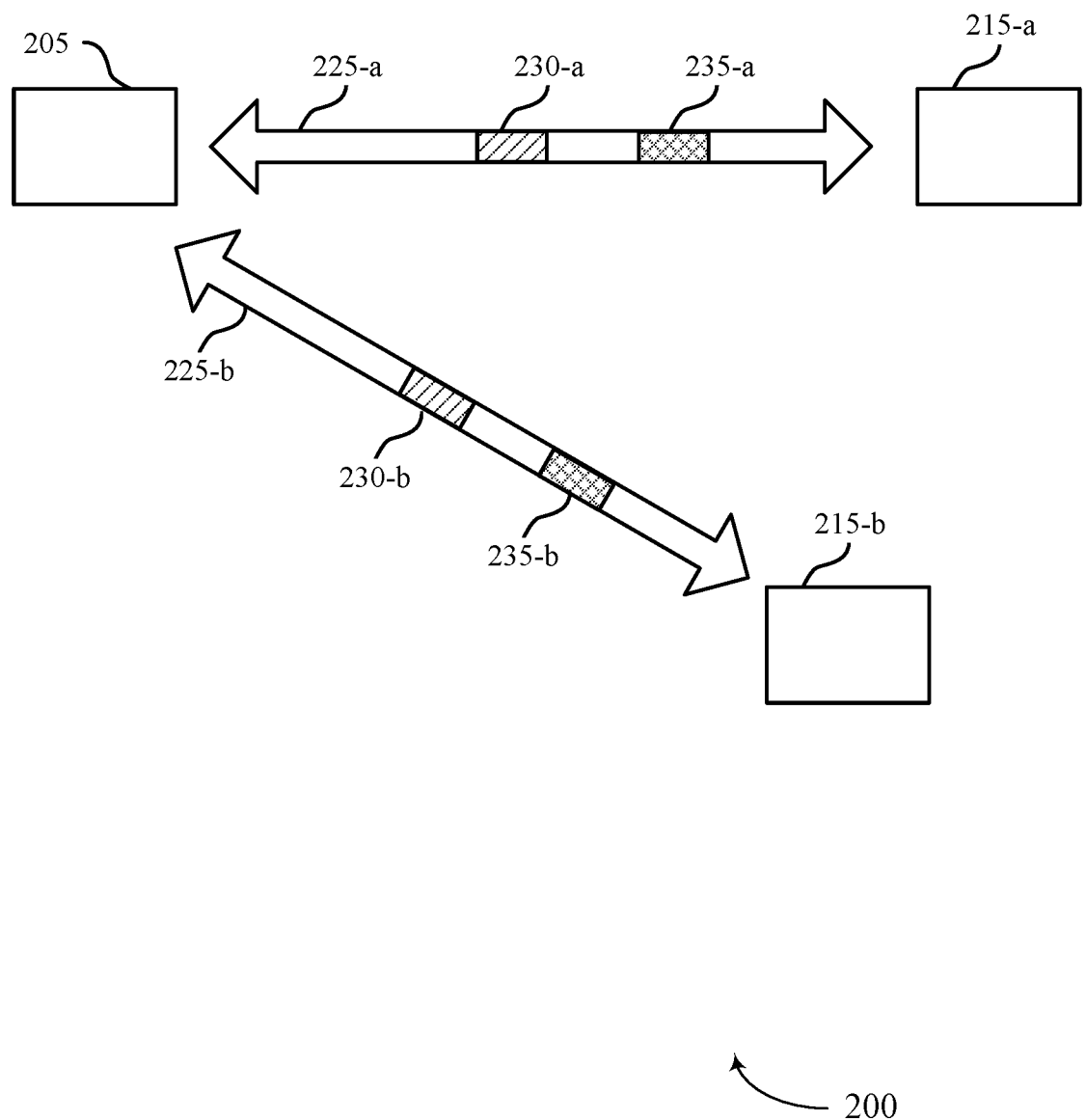
FIG. 2 illustrates an example of a wireless communications system that supports techniques for CP compatible formulation of single carrier waveforms in accordance with one or more aspects of the present disclosure.

FIG. 2 illustrates an example of a wireless communications system 200 that supports techniques for CP compatible formulation of single carrier waveforms in accordance with one or more aspects of the present disclosure. In some examples, wireless communications system 200 may implement aspects of wireless communications system 100. Wireless communications system 200 may include a first wireless device 205, a second wireless device 215-a, and a third wireless device 215-b. In some examples, the first wireless device 205 may be a network entity 105 as described herein, and the second wireless device 215-a and/or the third wireless device 215-b may be UEs 115 as described herein (e.g., in downlink examples). In some examples, the first wireless device 205, the second wireless device 215-a, and/or the third wireless device 215-b may all be UEs 115 as described herein (e.g., in sidelink examples).

In some examples, the first wireless device 205 may communicate with the second wireless device 215-a via a communication link 225-a, and the first wireless device 205 may communicate with the third wireless device 215-b via a communication link 225-b. The communication link 225-a and the communication link 225-b may include bi-directional links that enable both the uplink and downlink communication (or sidelink communication if the first wireless device 205 and the second wireless device 215-a and/or the third wireless device 215-b are UEs). For example, the second wireless device 215-a may transmit uplink signals (e.g., uplink transmissions), such as uplink control signals or uplink data signals, to the first wireless device 205 using the communication link 225-a and the first wireless device 205 may transmit downlink signals (e.g., downlink transmissions), such as downlink control signals or downlink data signals, to the second wireless device 215-a using the communication link 225-a. As another example, the third wireless device 215-b may transmit uplink signals (e.g., uplink transmissions), such as uplink control signals or uplink data signals, to the first wireless device 205 using the communication link 225-b and the first wireless device 205 may transmit downlink signals (e.g., downlink transmissions), such as downlink control signals or downlink data signals, to the third wireless device 215-b using the communication link 225-b.

For example, the first wireless device 205 may communicate transmissions 230-a, such as data transmissions, to the second wireless device 215-a via the communication link 225-a, and the first wireless device 205 may communicate transmissions 230-b, such as data transmission, with the third wireless device 215-b via the communication link 225-b. In some examples, the first wireless device 205 may communicate control signaling 235-a with the second wireless device 215-a, and/or the first wireless device 205 may communicate control signaling 235-b with the third wireless device 215-b.

In some examples, at least one of the transmissions 230-a and/or the transmissions 230-b may include a single carrier waveform represented in the OFDM compatible manner and the control signaling 235-a and/or the control signaling 235-b may include parameters to enable the waveform to be decoded. For example, the first wireless device 205 may generate the single carrier waveform represented in the OFDM compatible manner by applying a FFT to the single carrier waveform, applying bandwidth expansion and spectrum shaping to the output of the FFT, and applying an IFFT to the output of the bandwidth expansion and spectrum shaping to generate a waveform. For some single carrier waveforms, such as MSK, GMSK and CPM, the first wireless device 205 may also apply differential encoding.

In some examples, for example, for the transmission 230-a, the control signaling 235-a may indicate a waveform configuration of the transmission 230-a. The waveform configuration may indicate a set of waveform configuration parameters, such as a differential encoding type, a bandwidth expansion factor, a frequency shaping filter, a quantity of M symbols, and a quantity of N subcarriers. In some examples, the control signaling 235-a may indicated a CP length, an SCS, a symbol length in time and a sampling rate of the transmission 230-a. In some examples, the control signaling may indicate a single carrier waveform type, such as a DFT-s-OFDM waveform type, single carrier quadrature amplitude modulation waveform type, continuous phase modulation waveform type, minimum shift keying waveform type and Gaussian minimum shift keying waveform type.

In some examples, the second wireless device 215-a may receive the transmissions 230-a as a waveform. The second wireless device 215-a may decode the waveform using the bandwidth expansion factor and spectrum shaping filter.

The waveform design for wireless communications between the first wireless device 205, the second wireless device 215-a and/or the third wireless device 215-b may involve trade-offs between factors such as spectrum efficiency, PAPR, complexity, MIMO support and multiplexing flexibility. 5G systems, sixth generation systems and future generation wireless communications systems may be designed to support a diverse set of use cases, and each use case may have a set of goals. The key goals between use cases may not align. For example, enhanced mobile broadband applications may prefer multi-carrier waveforms such as CP-OFDM as they provide highest spectral efficiency and MIMO support. In another example, low power IoT devices and power-limited regimes, such as satellite uplink, may prefer lower PAPR and spectral efficiency may be less important. Waveforms, such as DFT-s-OFDM waveforms and SC-QAM waveforms, provide lower PAPR than CP-OFDM waveforms and lower PAPR may be beneficial in coverage limited scenarios. For the low power IoT and power-limited used cases, single carrier waveforms may be more suitable than multi-carrier waveforms. In some examples, phase noise may be an issue in higher bands, and single carrier waveforms may be better suited than multi-carrier waveforms to lessen phase noise.

One possible waveform design for the wireless communications system 200 with different use cases may be to multiplex multiple waveforms with each waveform selected for a particular use case. OFDM and DFT-s-OFDM are adopted in 5G wireless communications systems, so waveforms that are compatible in the OFDMA framework may be selected, and CP insertion may enables low complexity frequency-domain equalization. Waveforms that may be useful for different applications include single carrier waveform, such as SC-QAM, DFT-s-OFDM and its variants (e.g., zero-tail and unique word) and constant envelope waveforms, such as CPM with non-linear modulation. In some examples, the waveform design for the wireless communications system 200 with different use case may formulate and represent all waveforms on the same CP-OFDM grid or OFDMA grid to enable in-band orthogonal multiplexing, to enable unified generation using similar FFT or IFFT based processing, and to enable reuse of existing blocks for waveform generation and for receiver processing of waveforms. For example, the transmissions 230-a and the transmissions 230-b may be represented on the same CP-OFDM grid or OFDMA grid, and accordingly, may be multiplexed from the perspective of the first wireless device 205.

In some examples, single and multicarrier waveform designs may be available for wireless communications system 200, and waveforms may be formulated into the OFDMA framework. A unified generation of multiple types of waveforms using frequency domain FFT and IFFT processing may fit into the CP-OFDM grid. Waveforms formulated into the OFDMA framework may enable orthogonal in-band multiplexing of different waveforms in time or frequency on the same time frequency grid as CP-OFDM without guard bands. Waveforms formulated into the OFDMA framework may support CP insertion to enable low complexity equalization. Waveforms with non-linear modulation such as CPM may also fit the OFDMA framework. Waveforms formulated into the OFDMA framework may help with sharing spectrum across different RATs (e.g., dynamic spectrum sharing (DSS) or multi-resolution spectrum sensing (MRSS)). Some wireless communications systems, including legacy and next generation wireless system, may use CP-OFDM, and multiplexing multiple waveforms may be straightforward when the new waveforms introduced are CP-OFDM compatible. Formulation of waveforms in the CP-OFDM framework may enable any new waveforms for specific use cases to be easily supported. Waveforms with linear modulation (e.g., SC-QAM) or with non-linear modulation (e.g., constant-envelope waveforms such as CPM (e.g., MSK or GSK)) may fit into the CP-OFDM using frequency domain FFT and IFFT processing as described herein.

In some examples, SC-QAM and CPM waveforms may be formulated as DFT-s-OFDM with bandwidth expansion and spectrum shaping. Accordingly, SC-QAM and CPM may fit into the CP-OFDMA framework. Further, existing architectures may be leveraged for generation and processing of SC-QAM and CPM waveforms formulated as DFT-s-OFDM with a few additional blocks. For example, DFT-s-OFDM receiver structure may be used for these waveforms. A few additional blocks may be appended, such as for combining repeated tones or for differential encoding or decoding in case of CPM waveforms. Parameters such as CP length, sampling rate may be selected to multiplex multiple waveforms on the same CP-OFDM grid. Insertion of a CP for a CPM waveform may include inclusion of overhead symbols to maintain phase continuity at CP-symbol and symbol-symbol boundaries.

In some examples, SC-QAM waveforms may be formulated as OFDM compatible. Single-carrier waveform SC-QAM in a linear modulation may transmit QAM symbols in time with pulse shaping. A baseband representation of SC-QAM waveform is given by $x(t)=\Sigma_{k=0}^{M-1} s_k g(t-kT_s)$ with time (t), M quantity of symbols, complex QAM symbols $s_k$, and symbol duration ($T_s$). To reduce spectral leakage, each QAM symbol may be pulse-shaped that may lead to some bandwidth expansion and PAPR growth. In some examples, g(t) may be a half-Nyquist pulse, and have a matched filter pulse at the receiver so a concatenated response h(t) satisfies the Nyquist inter-symbol interference (ISI) criterion. In some examples, g(t) may be a square root raised cosine (SRRC) pulse with bandwidth expansion factor (β), and the concatenated response h(t) is a raised cosine (RC) pulse. The bandwidth occupied for general bandwidth expansion factor β may be (1+β)/$T_s$ where $T_s$ is symbol duration. In some examples, the SC-QAM waveform may be represented in baseband as $$x(t) = \sum_{k=0}^{M-1} s_k g\left(t - k\left(\frac{T}{M}\right)\right) \text{ with } g(t) = 0, t = \pm \frac{kT}{M}, k \neq 0.$$

The SC-QAM waveform may be generated by sampling x(t) at N time instants with $$t = \frac{nT}{N}.$$

Defining $$x[n] = x\left(t = \frac{nT}{N}\right), \text{ and } g[n] = g\left(t = \frac{nT}{N}\right); x[n] = \sum_k s_k g\left(\frac{nT}{N} - \frac{kT}{M}\right) =$$
$$\sum_k x_k g\left[n - \frac{kN}{M}\right] = \sum_k s_k g[n - 2k] = g[n] \star \sum s_k \delta[n - 2k],$$

suppose for example N/M=2. The SC-QAM waveform may be generated as $\Sigma s_k \delta[n-2k]$: [$s_0$, 0, $s_1$, 0, $s_2$, ..., 0, $s_{M-1}$] with $s_0, s_1, s_2, \ldots, s_{M-1}$ being complex QAM symbols. In some examples, x[n] may be generated using FFT and IFFT processing.

In some examples, SC-QAM waveforms may be generated to be OFDM compatible. The CP-OFDM grid may have a CP-free symbol duration T with total bandwidth of $$W = \frac{N}{T}.$$

M quantity of QAM symbols over duration T=$MT_s$ may be modulated as SC-QAM with pulse g(t) using SRRC pulse g(t) with $$\frac{1}{T_s} = \frac{M}{T}$$

and the concatenated response h(t) as the RC pulse h(t)=0, $$t = \pm \frac{kT}{M},$$

k≠0. The equation $$x(t) = \sum_{k=0}^{M-1} s_k g\left(t - k\left(\frac{T}{M}\right)\right)$$

may be sampled at N time instants, $$\left(\text{e.g., } t = \frac{nT}{N}\right)$$

to obtain N samples.

Figure 3:
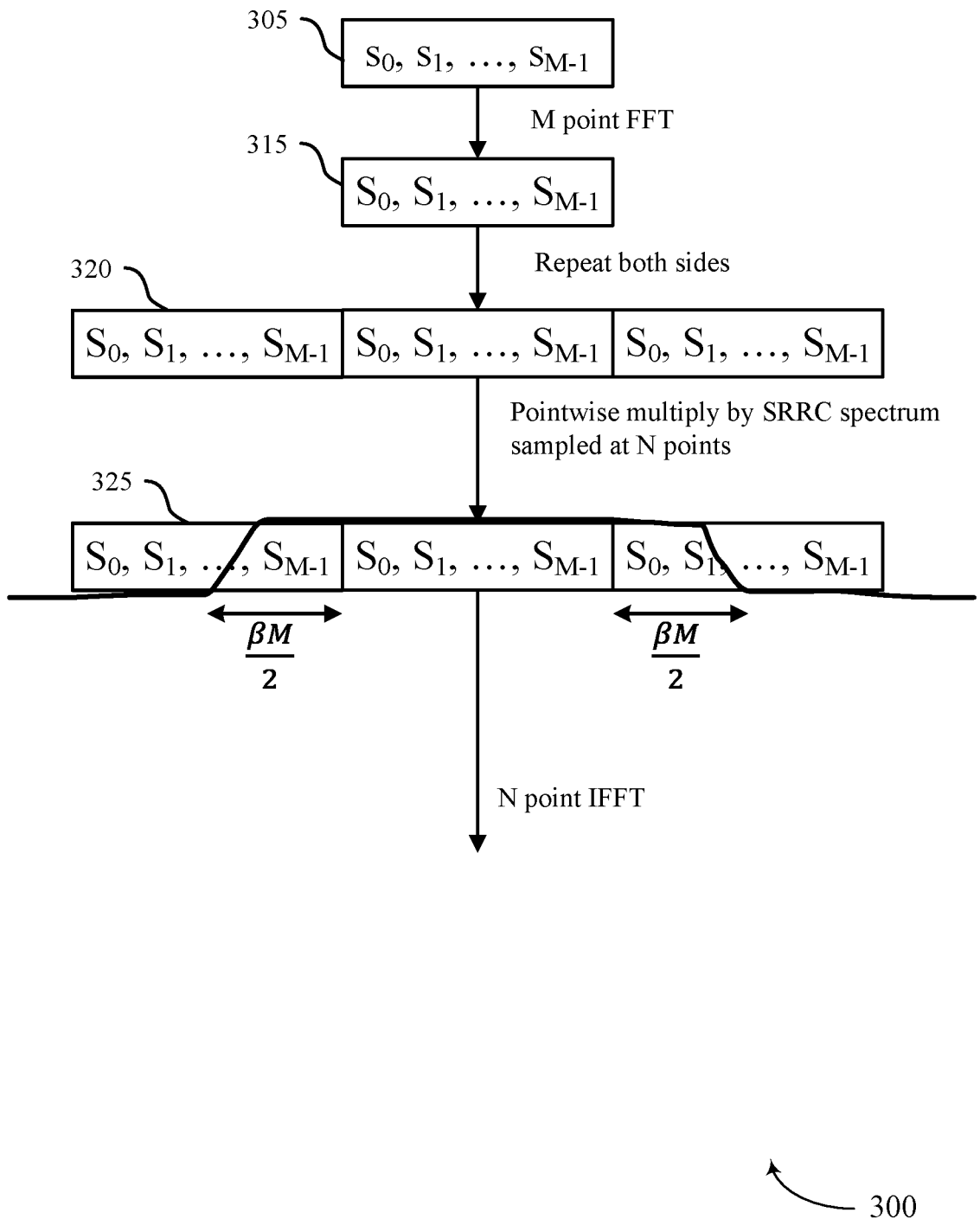
FIG. 3 illustrates an example of a sampling process diagram that supports techniques for CP compatible formulation of single carrier waveforms in accordance with one or more aspects of the present disclosure.

FIG. 3 illustrates an example of a sampling process diagram 300 that supports techniques for CP compatible formulation of single carrier waveforms in accordance with one or more aspects of the present disclosure. The sampling process diagram 300 may include sampling technique for formulating SC-QAM waveforms as OFDM compatible for transmissions in the wireless communications system 100 or wireless communications system 200.

In some examples, a set of data samples s[n] of the SC-QAM waveform may be generated to be similar to DFT-s-OFDM with bandwidth expansion and spectrum shaping. At 305, M complex QAM symbols, may be encoded from a data set as s, $s_1, \ldots s_{M-1}$. At 315, An M-point FFT may be performed on the symbols $s_0, s_1, \ldots s_{M-1}$ to provide the output at 315 of $S_0, S_1, \ldots S_{M-1}$. The output at 315 may be repeated at both sides to provide the output at 320. Bandwidth expansion and spectrum shaping may be performed on the output at 320 to provide the output at 325. The bandwidth expansion may be performed using the bandwidth expansion factor $\beta$, and the spectrum shaping may be performed using the frequency shaping filter, such as pointwise multiplying by SRRC spectrum sampled at N points (e.g., multiply by $\sqrt{S_{RC}(\ell)}$). $S_{RC}(\ell)$ is given by equation 1 below.

$$S_{RC}(\ell) = \begin{cases} 1 & |l| \leq \frac{(1-\beta)M}{2} \\ \frac{1}{2}\left[1 + \cos\left(\frac{\pi}{M\beta}\left\{\frac{1}{0}|l| - \frac{(1-\beta)M}{2}\right\}\right)\right], & \frac{(1-\beta)M}{2} < |l| \leq \frac{(1+\beta)M}{2} \\ & \text{otherwise} \end{cases} \quad (1)$$

An N point IFFT may be performed on the output at 325 to generate the OFDM compatible waveform. The size of the IFFT may be N quantity of subcarriers. The output of the IFFT may occupy $M(1+\beta)$ tones out of N tones on the OFDMA grid, and over-sampling may handle a case when $\beta M$ is not an integer.

In some examples, CPM waveforms may be formulated as OFDM compatible. CPM waveforms may involve non-linear modulation that produces a constant-envelope waveform that is non-linear due to memory with 0 decibel (db) PAPR. For CPM waveforms, phase may vary continuously and information may be carried in the phase. CPM waveforms may be represented by $$x(t, s) = \sqrt{\frac{2E_s}{T_s}} e^{j\theta(t,s)}$$

and $\theta(t,s) = 2\pi h \Sigma_n s_n q(t-nT_s)$ where s are M-ary amplitude shift keying (ASK) symbols $s_n \in \{\pm 1, \pm 3, \ldots, \pm(M-1)\}$, $E_s$ is energy per symbol, $T_s$ is symbol duration, h is modulation index parameter (a rational number, smaller h leads to narrow occupies bandwidth, typical choice h=½), q(t) is a phase response or a phase-shaping function, related to the frequency response f(t) according to $q(t) = \int_0^t f(\tau)d\tau$, the frequency response f(t) has support $[0, LT_s]$ and satisfies: $\int_0^{LT_s} f(\tau)d\tau = 0.5$, L is the memory (L=1 is called total response CPM, and L>1 is called partial response CPM, with larger L, side-lobes are reduced but more complex receiver). Two example CPM schemes may be MSK and GMSK.

MSK waveforms are a special case of CPW with a modulation format of Binary Phase-shift keying (BPSK), $s_k \in \{+1, -1\}$, modulation index of h=0.5, and frequency response $f(t) = r_{T_s}(t)$ is the rectangular function of duration $T_s$. The continuous phase may reduce spectral side lobes as $\theta(t) = \pi h \int_0^t \varepsilon_k s_k \cdot f(\tau - kT_s)d\tau = \pi h \int_0^t \Sigma_k s_k \cdot r_{T_s}(\tau - kT_s)d\tau$ and introduces memory. The maximum-phase change in one symbol duration may be $\pi/2$ and an input symbol of +1 may cause the phase to increase linearly by $\pi/2$ and an input symbol of −1 may cause the phase to decrease by $\pi/2$.

Figure 4:
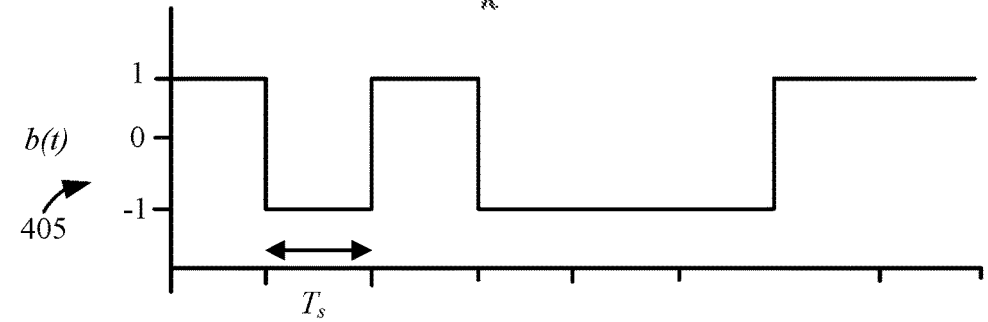
FIG. 4 illustrates an example of a minimum shift keying waveform that supports techniques for CP compatible formulation of single carrier waveforms in accordance with one or more aspects of the present disclosure.
Figure 4:
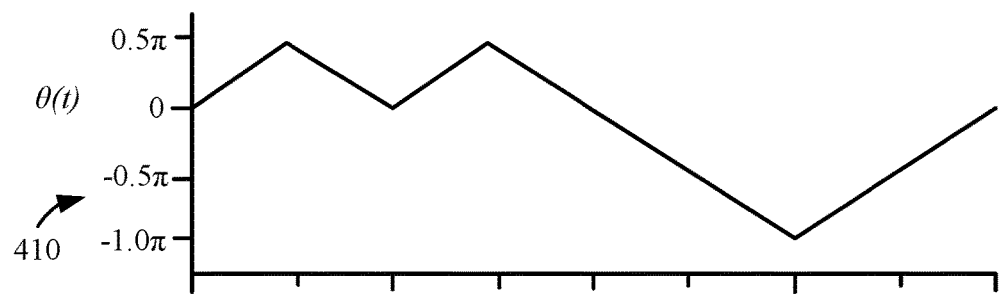
Figure 4:
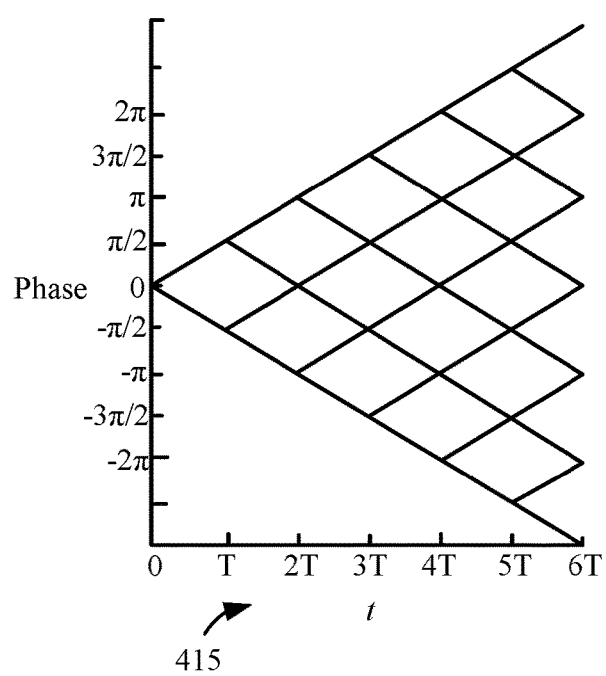
Figure 4:
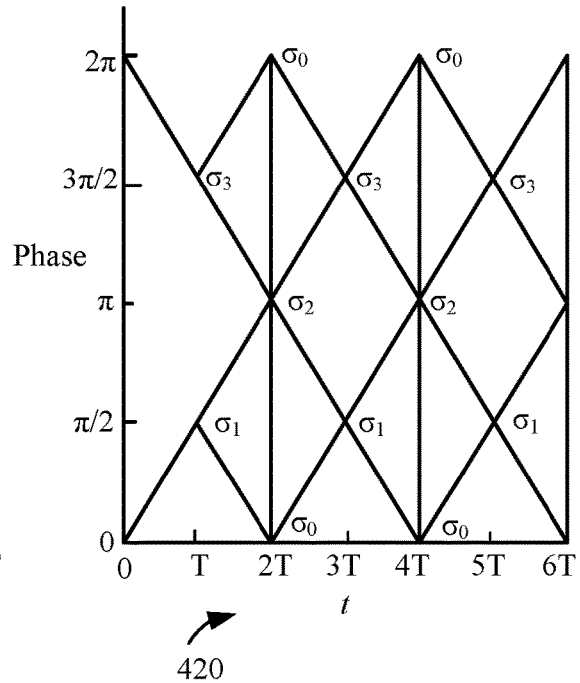

FIG. 4 illustrates an example of a MSK waveform 400 that supports techniques for CP compatible formulation of single carrier waveforms in accordance with one or more aspects of the present disclosure. The MSK waveform 400 may be formulating as OFDM compatible for transmissions in the wireless communications system 100 or wireless communications system 200. The MSK waveform 400 may have a BPSK modulation format 405 and phase diagram 410. The MSK waveform 400 may have a phase tree 415 and modulo-$2\pi$ phase tree 420. MSK may be viewed as offset Quadrature Phase Shift Keying (QPSK) with differential encoding and sinusoidal pulse shaping:

$$x(t) = a_I(t)\cos\left(\frac{\pi t}{2T_s}\right) + ja_Q(t)\sin\left(\frac{\pi t}{2T_s}\right),$$

$$a_I(t) = \left(\sum_k a_{2k} r_{2T_s}(t - 2kT_s)\right) a_Q(t) = -\left(\sum_k a_{2k+1} r_{2T_s}(t - T_s - 2kT_s)\right)$$

where $\alpha_k$ is obtained by differential encoding of the input stream $s_k$ such that $\alpha_k = -\alpha_{k-1} s_k$.

GMSK waveforms are a special case of CPM with modulation format of BPSK, $s_k \in \{+1, -1\}$, modulation index of h=0.5, and frequency response f(t) of a gaussian frequency shaping filter of length $LT_s$ (e.g., L=3). The binary bits may be filtered by the Gaussian filter before modulating the carrier frequency, and further phase change may reduce out of band (OOB) leakage by further smoothing phase change. For CPM waveforms, addition of CP may be provided, and a cyclic guard may be inserted directly and may lead to loss of phase continuity. Abrupt phase transition at a CP-symbol and symbol-symbol boundaries may cause some emission and PAPR regrowth. Additional overhead symbols may be inserted to keep phase continuous. For example, for MSK, one symbol per data block may be sufficient, and 2 symbols per data block may force phase to return to 0 at boundaries.

In some examples, a raised cosine spectrum may be used for the spectrum shaping as the frequency shaping filter. The raised cosine family may be spectra that satisfy the Nyquist Theorem and are represented as $$Z(f) = \begin{cases} T_s & 0 \leq |f| \leq \frac{1-\beta}{2T_s} \\ \frac{T_s}{2}\left\{1 + \cos\left[\frac{\pi T_s}{\beta}\left(|f| - \frac{1-\beta}{2T_s}\right)\right]\right\} & \frac{1-\beta}{2T_s} \leq |f| \leq \frac{1+\beta}{2T_s} \\ 0 & |f| > \frac{1+\beta}{2T_s} \end{cases}$$

$$z(t) = \frac{\cos\left(\pi\beta\frac{t}{T_s}\right)}{1 - \left(2\beta\frac{t}{T}\right)^2} \times \frac{\sin\pi\frac{t}{T_s}}{\pi\frac{t}{T_s}}$$

where z(t) is the RC pulse, it is infinite duration in time, z(t) has zero crossings at $t=\pm kT_s$, $k\neq 0$, the bandwidth occupied for general $\beta$ is $$\frac{1+\beta}{T_s}$$

and when $\beta=0$ the spectrum is perfect brick-wall with bandwidth=$2*1/(2\,T_s)$.

In some examples, MSK waveforms may be formulated as OFDM compatible by differential encoding, performing FFT, performing bandwidth expansion and spectrum shaping, and then performing IFFT. For the CP-OFDM grid with CP-free symbol duration T and total bandwidth of W=N/T, the offset QPSK representation for MSK may be used. The MSK waveform may be encoded as M BPSK symbols over a duration $T=MT_s$ with input stream BPSK $s_k$ to obtain $\alpha_k$ by differential encoding such that $\alpha_k=-\alpha_{k-1}s_k$. In some examples, $$g(t) = \cos\left(\frac{\pi t}{2T_s}\right) r_{2T_s}(t)$$

and the MSK signal may involve the form of $x(t)=\Sigma_k\alpha_{2k}g(t-2kT_s)+j\Sigma_k(-\alpha_{2k+1})g(t-2kT_s-T_s)$. Sampling the x(t) equation at N time instants over duration T may provide $$x[n] = x\left(t = \frac{nT}{N}\right) =$$
$$\sum_k a_{2k}g\left[n-\frac{2kN}{M}\right] + j\sum_k(-a_{2k+1})g\left[n-\frac{(2k+1)N}{M}\right] = \sum_k c_k g\left[n-\frac{kN}{M}\right]$$

and $$c_k = (-1)^k e^{jk\frac{\pi}{2}} a_k.$$

Similar to SC-QAM case, final N samples x[n] may be generated using an M point FFT of $c_k$ followed by subcarrier allocation, bandwidth expansion and spectrum shaping by $G[\ell]=\text{FFT}(g[n])$. The OFDM compatible waveform may be generated by performing an N point IFFT on the output of the bandwidth expansion and spectrum shaping. The bandwidth expansion may be a pulse g(t) similar to SC-QAM case. In some cases, to enable multiplexing, CP of same length as CP-OFDM CP length may be appended to the output and some overhead symbols may be appended to keep the phase continuous.

In some examples, CPM waveforms may be formulated as OFDM compatible by differential encoding, performing FFT, performing bandwidth expansion and spectrum shaping and performing IFFT. Any binary CPM signal or M-ary CPM signals with modulation filter length L may be expressed as sum of $2^{L-1}$ pulse amplitude modulation (PAM) signals. In some examples, CPM may be a sum of a few modulated PAM signals, and most signal power may be in the first M-1 PAM components. A PAM signal may be generated in the OFDMA framework with FFT, IFFT and spectrum shaping. For example, a GMSK with L=3 may be represented as $$x(t) = \sqrt{\frac{2E_s}{T_s}} \sum_{k=0}^{3}\sum_n j^n a_{k,n} h_k(t-nT_s)$$

and one component PAM signal ($h_0(t)$) may contain greater than 99.5% of total signal energy $$x(t) \approx \sqrt{\frac{2E_s}{T_s}} \sum_n j^n a_{0,n} h_0(t-nT_s)$$

where $\alpha_{0,n}$ is related to input stream $s_n$ through differential encoding: $\alpha_{0,n}=s_n\alpha_{0,n-1}$. In some examples, the CPM signal may be generated in the OFDMA framework and may be multiplexed in-band on the same OFDMA time frequency grid with other waveforms such as OFDM, DFT-s-OFDM, and/or SC-QAM. A non-linear aspect of CPM modulation may be due to memory and may be captured by differential encoding of input stream before generation in this framework. Additionally, CP may be added after the signal generation. To maintain phase continuity, some overhead symbols may be added.

In some examples, the receiver (e.g., the second wireless device 215-a of FIG. 2), may use FFT and IFFT blocks to receive the waveforms. In some examples, although the generation of the OFDM compatible waveforms may use FFT and IFFT, the receiver may not use FFT and IFFT blocks to receive the waveforms. For example, although an SC-QAM waveform may be generated to be compatible with CP-OFDM, the receiver may use common approaches to receive the waveform. For the waveforms formulated as OFMD compatible, the waveforms may follow the same numerology as CP-OFDM with the same sampling rate and CP length. The parameters of sampling rate and CP length may be indicated to the wireless device separately from the control signaling scheduling the transmissions, or these parameters may be included in the numerology that is configured for a BWP or component carrier (CC) in which the waveform is transmitted.

In some examples, the wireless device functioning as the transmitter (e.g., the first wireless device 205 of FIG. 2) may indicate to the wireless device functioning as the receiver (e.g., the second wireless device 215-a of FIG. 2), which of the defined multiple waveform types (e.g., CP-OFDM, DFT-s-OFDM, MSK, GMSK) is used for the transmission, for example in control signaling 235-a as shown in FIG. 2. Alternatively, the wireless device functioning as the transmitter may indicate a set of waveform configuration parameters, such as bandwidth expansion factor, a frequency shaping filter, a quantity of symbols, and a quantity of subcarriers to the receiver, and the receiver may identify the waveform type (e.g., CP-OFDM, DFT-s-OFDM, MSK, GMSK) based on the set of waveform configuration parameters. In some uplink examples, where the transmitter is a UE 115 and the receiver is a network entity 105, the network entity 105 105 may indicate which waveform type, or which waveform configuration parameters to apply to a given transmission.

For example, the indication of a non-zero bandwidth expansion parameter, specific modulation order like BPSK and frequency-domain shaping filter may indicate MSK, SC-QAM or GMSK waveform types. Whether the waveform type is indicated explicitly or implicitly, the waveform configuration parameters may be conveyed to the receiver (or by the receiver in uplink scenarios) via control signaling, such as semi-static signaling (e.g., via RRC) or more dynamic signaling (e.g., a MAC control element (MAC-CE) or downlink control information (DCI)) (e.g., the control signaling 235-a of FIG. 2 may be RRC, MAC-CE, or DCI). The waveform configuration parameters may be differential encoding type, bandwidth expansion factor, frequency shaping filter, M quantity of symbols, N quantity of subcarriers, a CP length, SCS, and/or a sampling rate. The waveform configuration parameters may be conveyed in one or more control messages (e.g., the control signaling 235-a may be multiple control signals/messages).

Figure 5:
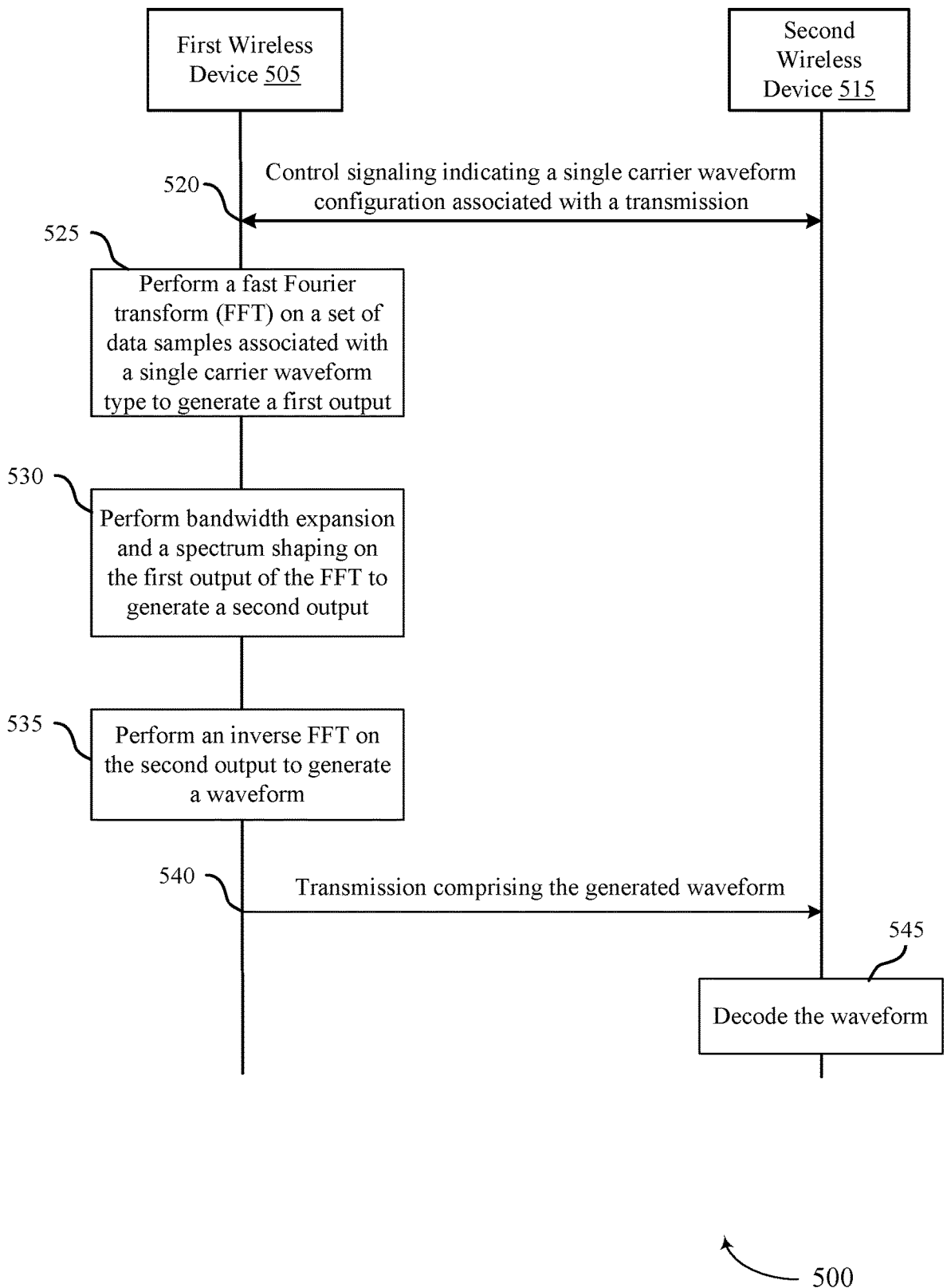
FIG. 5 illustrates an example of a process flow that supports techniques for CP compatible formulation of single carrier waveforms in accordance with one or more aspects of the present disclosure.

FIG. 5 illustrates an example of a process flow 500 that supports techniques for CP compatible formulation of single carrier waveforms in accordance with one or more aspects of the present disclosure. The process flow may include a first wireless device 505 and a second wireless device 515, which may be an example of the first wireless device 205 and the second wireless device 215-a described herein. In the following description of the process flow 500, the operations between the first wireless device 505 and the second wireless device 515 may be transmitted in a different order than the example order shown, or the operations performed by the first wireless device 505 and the second wireless device 515 may be performed in different orders or at different times. Some operations may also be omitted from the process flow 500, and other operations may be added to the process flow 500.

At 520, the first wireless device 505 may communicate control signaling with the second wireless device 515. The control signaling may indicate a single carrier waveform configuration associated with a transmission. In some examples, the single carrier waveform configuration may indicate a set of parameters including at least one of a differential encoding type, a single carrier waveform type, a bandwidth expansion factor, a frequency shaping filter, a quantity of symbols M, and a quantity of subcarriers N. At 525, the first wireless device 505 may perform a FFT on a set of data samples associated with the single carrier waveform type to generate a first output. In some examples, a size of the FFT may be associated with the quantity of symbols (e.g., an M-point FFT). In some examples, the single carrier waveform type may include a SC-QAM waveform type, an MSK waveform type, a GMSK waveform type, or a CPM waveform type. For some single carrier waveforms, such as MSK, GMSK and CPM, the first wireless device 505 may also apply differential encoding.

At 530, the first wireless device 505 may perform bandwidth expansion in accordance with the bandwidth expansion factor and a spectrum shaping in accordance with the frequency shaping filter on the first output of the FFT to generate a second output. At 535, the first wireless device 505 may perform an IFFT on the second output to generate a waveform. In some examples, a size of the IFFT may be associated with the quantity of subcarriers (e.g., an N-point IFFT). At 540, the first wireless device 505 may transmit the transmission that includes the generated waveform. The second wireless device 515 may receive the transmission including the waveform. In some examples, the second wireless device 515 may receive the transmission from the first wireless device 505 via the quantity of symbols M and the quantity of subcarriers N. At 545, the second wireless device 515 may decode the waveform in accordance with the bandwidth expansion factor and the frequency shaping filter to identify a set of data samples associated with the single carrier waveform type.

In some examples, the first wireless device 505 may communicate, with the second wireless device 515, control information indicating a CP length, a SCS, a symbol length in time and a sampling rate associated with the transmission. In some examples, the waveform may be generated in accordance with the CP length, the SCS, the symbol length and the sampling rate. In some examples, to communicate the control information, the first wireless device 505 may communicate second control signaling indicating the CP length, the SCS, and the sampling rate are associated with a BWP or a CC. For example, the first control signaling may be transmitted in a different control message than the second control signaling. In some examples, the transmission is associated with the BWP (e.g., the transmission is scheduled for transmission within the BWP) or the CC. In some examples, the first wireless device 505 may append a CP having the CP length to each symbol of the output of the IFFT to generate the waveform. In some examples, the first wireless device 505 may communicate an indication of the single carrier waveform type from a set of single carrier waveform types.

In some examples, the set of single carrier waveform types may include two or more of a DFT-s-OFDM waveform type, the SC-QAM waveform type, the MSK waveform type, the GMSK waveform type, or the CPM waveform type. In some examples, the bandwidth expansion factor and the frequency shaping filter are based at least in part on the single carrier waveform type.

In some examples, the first wireless device 505 may generate the set of data samples by performing differential encoding on a data stream in accordance with a memory parameter, a modulation index and a modulation order parameter with the single carrier waveform type being the CPM waveform type and the waveform configuration may indicate the memory parameter and the modulation order parameter.

In some examples, the first wireless device 505 is a UE and the second wireless device 515 is a network entity. In some examples, the first wireless device 505 is a network equipment and the second wireless device 515 is a UE.

Figure 6:
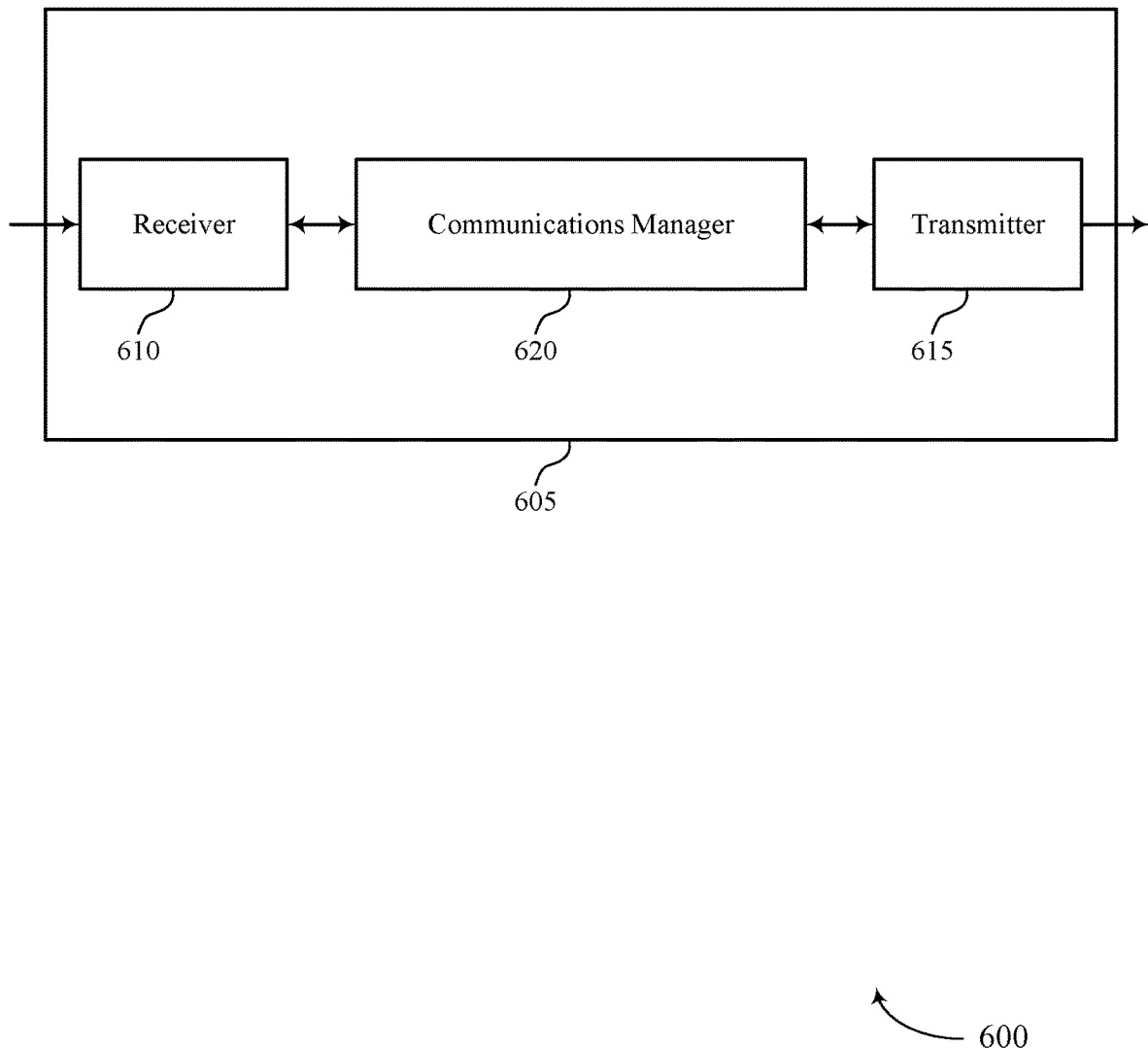
FIGS. 6 and 7 illustrate block diagrams of devices that support techniques for CP compatible formulation of single carrier waveforms in accordance with one or more aspects of the present disclosure.

FIG. 6 illustrates a block diagram 600 of a device 605 that supports techniques for CP compatible formulation of single carrier waveforms in accordance with one or more aspects of the present disclosure. The device 605 may be an example of aspects of a UE 115 or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for CP compatible formulation of single carrier waveforms). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for CP compatible formulation of single carrier waveforms). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for CP compatible formulation of single carrier waveforms as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first wireless device in accordance with examples as disclosed herein. For example, the communications manager 620 may be configured as or otherwise support a means for communicating, with a second wireless device, control signaling indicating a single carrier waveform configuration associated with a transmission, the single carrier waveform configuration indicating a set of parameters including at least one of a single carrier waveform type, a differential encoding type, a bandwidth expansion factor, a frequency shaping filter, a quantity of symbols, and a quantity of subcarriers. The communications manager 620 may be configured as or otherwise support a means for performing a FFT on a set of data samples associated with the single carrier waveform type to generate a first output, a size of the FFT associated with the quantity of symbols, the single carrier waveform type may include a SC-QAM waveform type, an MSK waveform type, a GMSK waveform type, or a CPM waveform type. The communications manager 620 may be configured as or otherwise support a means for performing bandwidth expansion in accordance with the bandwidth expansion factor and a spectrum shaping in accordance with the frequency shaping filter on the first output of the FFT to generate a second output. The communications manager 620 may be configured as or otherwise support a means for performing differential encoding in accordance with the differential encoding type. The communications manager 620 may be configured as or otherwise support a means for performing an IFFT on the second output to generate a waveform, a size of the IFFT associated with the quantity of subcarriers. The communications manager 620 may be configured as or otherwise support a means for transmitting, to the second wireless device, the transmission including the generated waveform.

Additionally, or alternatively, the communications manager 620 may support wireless communications at a second wireless device in accordance with examples as disclosed herein. For example, the communications manager 620 may be configured as or otherwise support a means for communicating, with a first wireless device, control signaling indicating a single carrier waveform configuration associated with a transmission, the single carrier waveform configuration indicating a set of parameters including at least one of a single carrier waveform type, a differential encoding type, a bandwidth expansion factor, a frequency shaping filter, a quantity of symbols, and a quantity of subcarriers, the single carrier waveform type may include a SC-QAM waveform type, an MSK waveform type, a GMSK waveform type, or a CPM waveform type. The communications manager 620 may be configured as or otherwise support a means for receiving, from the first wireless device via the quantity of symbols and the quantity of subcarriers, the transmission including a waveform. The communications manager 620 may be configured as or otherwise support a means for decoding the waveform in accordance with the bandwidth expansion factor and the frequency shaping filter to identify a set of data samples associated with the single carrier waveform type.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more efficient utilization of communication resources.

Figure 7:
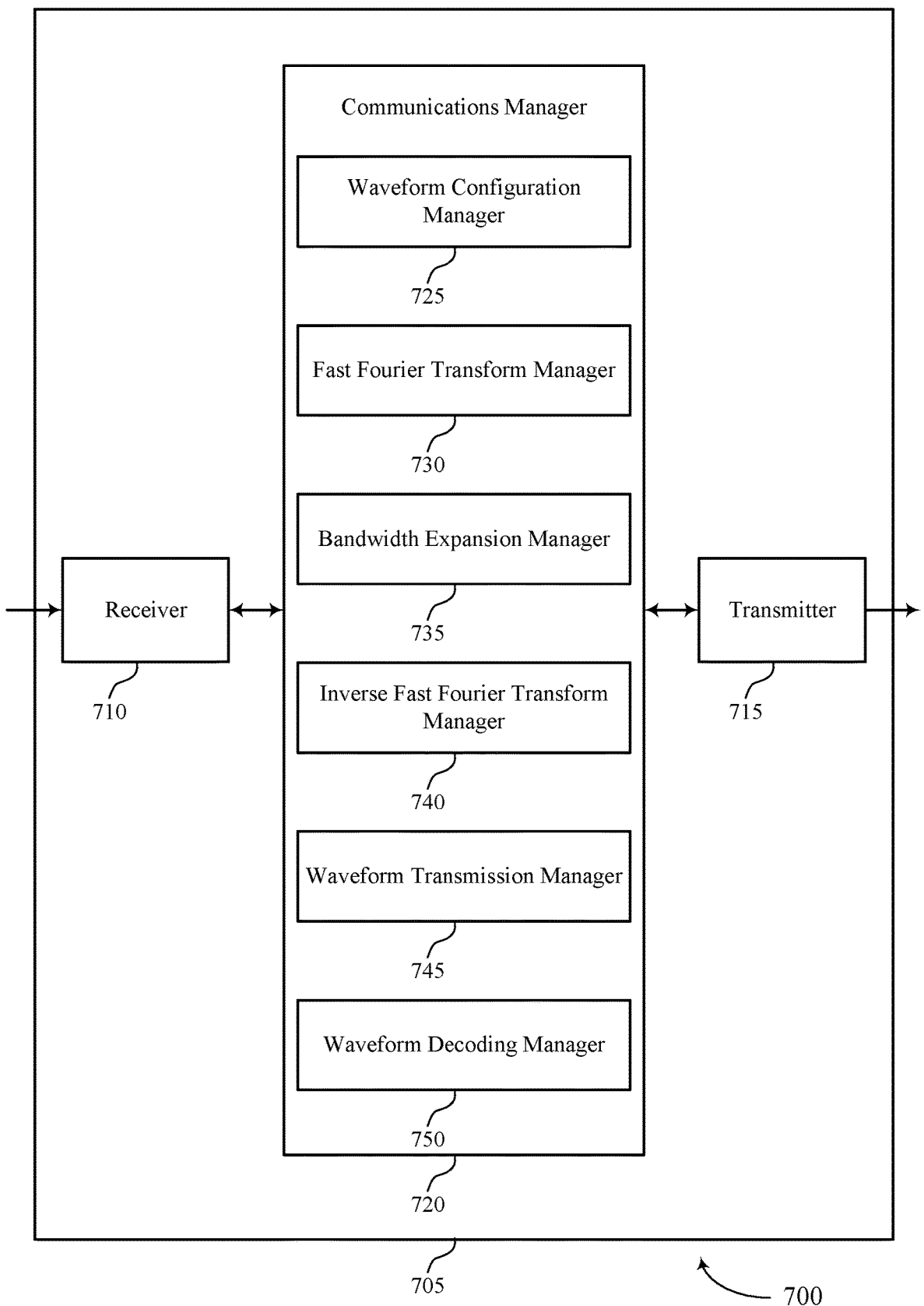

FIG. 7 illustrates a block diagram 700 of a device 705 that supports techniques for CP compatible formulation of single carrier waveforms in accordance with one or more aspects of the present disclosure. The device 705 may be an example of aspects of a device 605, a UE 115, or a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for CP compatible formulation of single carrier waveforms). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for CP compatible formulation of single carrier waveforms). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for CP compatible formulation of single carrier waveforms as described herein. For example, the communications manager 720 may include a waveform configuration manager 725, a FFT manager 730, a bandwidth expansion manager 735, an IFFT manager 740, a waveform transmission manager 745, a waveform decoding manager 750, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first wireless device in accordance with examples as disclosed herein. The waveform configuration manager 725 may be configured as or otherwise support a means for communicating, with a second wireless device, control signaling indicating a single carrier waveform configuration associated with a transmission, the waveform configuration indicating a set of parameters including at least one of a single carrier waveform type, a bandwidth expansion factor, a frequency shaping filter, a quantity of symbols, and a quantity of subcarriers. The FFT manager 730 may be configured as or otherwise support a means for performing a FFT on a set of data samples associated with the single carrier waveform type to generate a first output, a size of the FFT associated with the quantity of symbols, the single carrier waveform type may include a SC-QAM waveform type, an MSK waveform type, a GMSK waveform type, or a CPM waveform type. The bandwidth expansion manager 735 may be configured as or otherwise support a means for performing bandwidth expansion in accordance with the bandwidth expansion factor and a spectrum shaping in accordance with the frequency shaping filter on the first output of the FFT to generate a second output. The IFFT manager 740 may be configured as or otherwise support a means for performing an IFFT on the second output to generate a waveform, a size of the IFFT associated with the quantity of subcarriers. The waveform transmission manager 745 may be configured as or otherwise support a means for transmitting, to the second wireless device, the transmission including the generated waveform.

Additionally, or alternatively, the communications manager 720 may support wireless communications at a second wireless device in accordance with examples as disclosed herein. The waveform configuration manager 725 may be configured as or otherwise support a means for communicating, with a first wireless device, control signaling indicating a single carrier waveform configuration associated with a transmission, the waveform configuration indicating a set of parameters including at least one of a single carrier waveform type, a bandwidth expansion factor, a frequency shaping filter, a quantity of symbols, and a quantity of subcarriers, the single carrier waveform type may include a SC-QAM waveform type, an MSK waveform type, a GMSK waveform type, or a CPM waveform type. The waveform transmission manager 745 may be configured as or otherwise support a means for receiving, from the first wireless device via the quantity of symbols and the quantity of subcarriers, the transmission including a waveform. The waveform decoding manager 750 may be configured as or otherwise support a means for decoding the waveform in accordance with the bandwidth expansion factor and the frequency shaping filter to identify a set of data samples associated with the single carrier waveform type.

Figure 8:
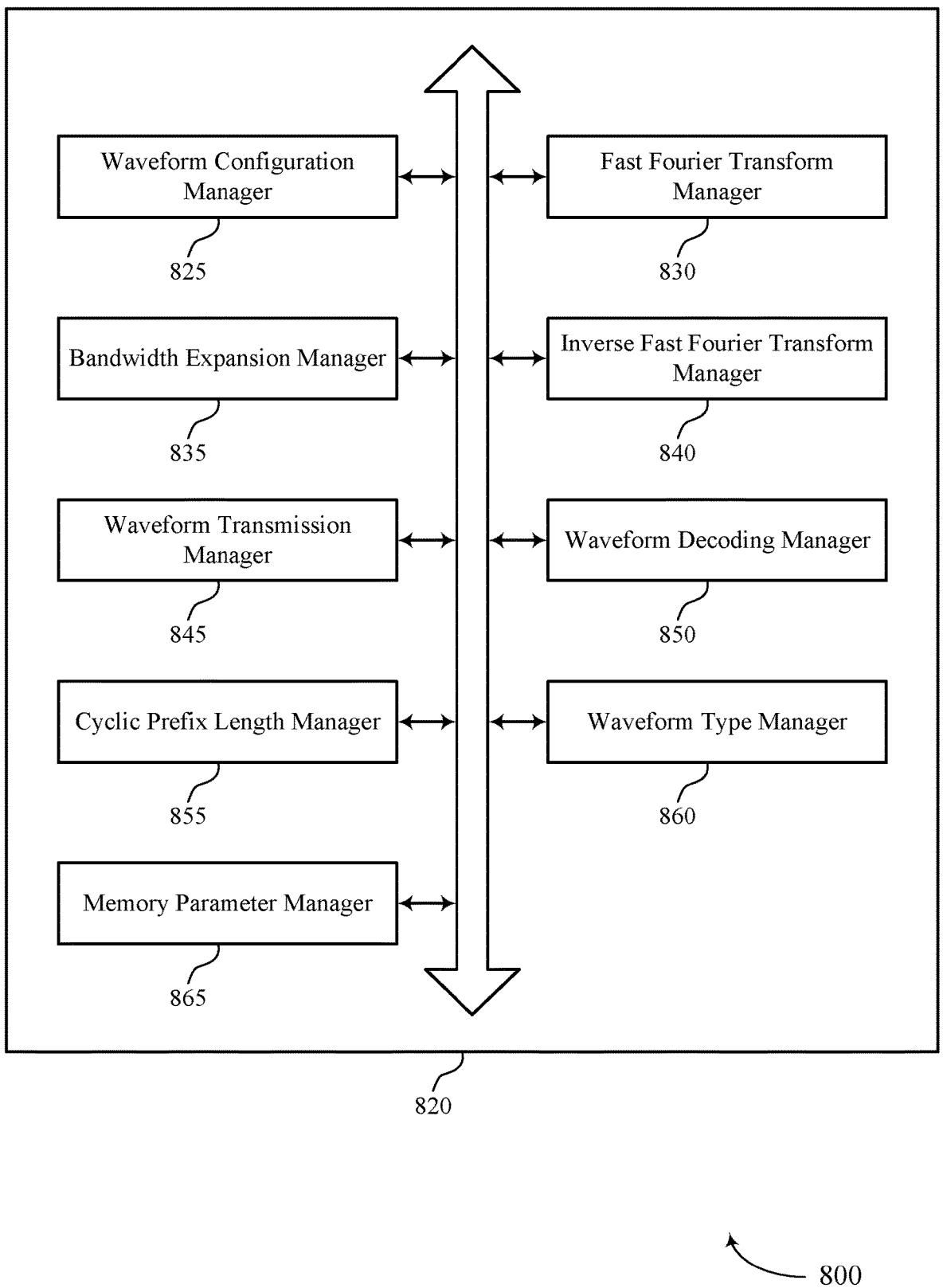
FIG. 8 illustrates a block diagram of a communications manager that supports techniques for CP compatible formulation of single carrier waveforms in accordance with one or more aspects of the present disclosure.

FIG. 8 illustrates a block diagram 800 of a communications manager 820 that supports techniques for CP compatible formulation of single carrier waveforms in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for CP compatible formulation of single carrier waveforms as described herein. For example, the communications manager 820 may include a waveform configuration manager 825, a FFT manager 830, a bandwidth expansion manager 835, an IFFT manager 840, a waveform transmission manager 845, a waveform decoding manager 850, a CP length manager 855, a waveform type manager 860, a memory parameter manager 865, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communications at a first wireless device in accordance with examples as disclosed herein. The waveform configuration manager 825 may be configured as or otherwise support a means for communicating, with a second wireless device, control signaling indicating a single carrier waveform configuration associated with a transmission, the single carrier waveform configuration indicating a set of parameters including at least one of a single carrier waveform type, a bandwidth expansion factor, a frequency shaping filter, a quantity of symbols, and a quantity of subcarriers. The FFT manager 830 may be configured as or otherwise support a means for performing a FFT on a set of data samples associated with the single carrier waveform type to generate a first output, a size of the FFT associated with the quantity of symbols, the single carrier waveform type may include a SC-QAM waveform type, an MSK waveform type, a GMSK waveform type, or a CPM waveform type. The bandwidth expansion manager 835 may be configured as or otherwise support a means for performing bandwidth expansion in accordance with the bandwidth expansion factor and a spectrum shaping in accordance with the frequency shaping filter on the first output of the FFT to generate a second output. The IFFT manager 840 may be configured as or otherwise support a means for performing an IFFT on the second output to generate a waveform, a size of the IFFT associated with the quantity of subcarriers. The waveform transmission manager 845 may be configured as or otherwise support a means for transmitting, to the second wireless device, the transmission including the generated waveform.

In some examples, the CP length manager 855 may be configured as or otherwise support a means for communicating, with the second wireless device, control information indicating a CP length, an SCS, a symbol length in time and a sampling rate associated with the transmission, where the waveform is generated in accordance with the CP length, the SCS, the symbol length and the sampling rate.

In some examples, to support communicating the control information, the CP length manager 855 may be configured as or otherwise support a means for communicating second control signaling indicating the CP length, the SCS, and the sampling rate are associated with a BWP or a CC, where the transmission is associated with the BWP or the CC.

In some examples, to support communicating the control information, the CP length manager 855 may be configured as or otherwise support a means for communicating the control information in a same control message as the control signaling indicating the single carrier waveform configuration.

In some examples, the CP length manager 855 may be configured as or otherwise support a means for appending a CP having the CP length to each symbol of a third output of the IFFT to generate the waveform.

In some examples, to support communicating the control signaling, the waveform type manager 860 may be configured as or otherwise support a means for communicating an indication of the single carrier waveform type from a set of single carrier waveform types, where the bandwidth expansion factor and the frequency shaping filter are based on the single carrier waveform type.

In some examples, the set of single carrier waveform types includes two or more of a DFT-s-OFDM waveform type, a SC-QAM waveform type, a MSK waveform type, a GMSK waveform type, or a CPM waveform type.

In some examples, the memory parameter manager 865 may be configured as or otherwise support a means for generating the set of data samples via performing differential encoding on a data stream in accordance with a memory parameter, a modulation index parameter and a modulation order parameter, where the single carrier waveform type includes a CPM waveform type, where the waveform configuration indicates the memory parameter, the modulation index parameter and the modulation order parameter.

In some examples, to support communicating the control signaling, the waveform configuration manager 825 may be configured as or otherwise support a means for receiving the control signaling, where the first wireless device is a UE and the second wireless device is a network entity.

In some examples, to support communicating the control signaling, the waveform configuration manager 825 may be configured as or otherwise support a means for transmitting the control signaling, where the first wireless device is a network entity and the second wireless device is a UE.

Additionally, or alternatively, the communications manager 820 may support wireless communications at a second wireless device in accordance with examples as disclosed herein. In some examples, the waveform configuration manager 825 may be configured as or otherwise support a means for communicating, with a first wireless device, control signaling indicating a single carrier waveform configuration associated with a transmission, the single carrier waveform configuration indicating a set of parameters including at least one of single carrier waveform type, a bandwidth expansion factor, a frequency shaping filter, a quantity of symbols, and a quantity of subcarriers, the single carrier waveform type may include a SC-QAM waveform type, an MSK waveform type, a GMSK waveform type, or a CPM waveform type. In some examples, the waveform transmission manager 845 may be configured as or otherwise support a means for receiving, from the first wireless device via the quantity of symbols and the quantity of subcarriers, the transmission including a waveform. The waveform decoding manager 850 may be configured as or otherwise support a means for decoding the waveform in accordance with the bandwidth expansion factor and the frequency shaping filter to identify a set of data samples associated with the single carrier waveform type.

In some examples, the CP length manager 855 may be configured as or otherwise support a means for communicating, with the first wireless device, control information indicating a CP length, an SCS, a symbol length in time and a sampling rate associated with the transmission, where decoding the waveform includes decoding the waveform in accordance with the CP length, the SCS, the symbol length and the sampling rate.

In some examples, to support communicating the control information, the CP length manager 855 may be configured as or otherwise support a means for communicating second control signaling indicating the CP length, the SCS, and the sampling rate are associated with a BWP or a CC, where the transmission is associated with the BWP or CC.

In some examples, to support communicating the control information, the CP length manager 855 may be configured as or otherwise support a means for communicating the control information in a same control message as the control signaling indicating the single carrier waveform configuration.

In some examples, to support decoding the waveform in accordance with the CP length, the CP length manager 855 may be configured as or otherwise support a means for removing a CP having the CP length from each symbol of the waveform.

In some examples, to support communicating the control signaling, the waveform type manager 860 may be configured as or otherwise support a means for communicating an indication of the single carrier waveform type from a set of single carrier waveform types, where the bandwidth expansion factor and the frequency shaping filter are based on the single carrier waveform type.

In some examples, the set of single carrier waveform types includes two or more of a DFT-s-OFDM waveform type, a SC-QAM waveform type, a MSK waveform type, a GMSK waveform type, or a CPM waveform type.

In some examples, to support decoding the waveform to identify the set of data samples, the memory parameter manager 865 may be configured as or otherwise support a means for decoding the waveform in accordance with a memory parameter, a modulation index parameter and a modulation order parameter, where the single carrier waveform type includes a CPM waveform type, where the single carrier waveform configuration indicates the memory parameter, the modulation index parameter and the modulation order parameter.

In some examples, to support communicating the control signaling, the waveform configuration manager 825 may be configured as or otherwise support a means for transmitting the control signaling, where the first wireless device is a UE and the second wireless device is a network entity.

In some examples, to support communicating the control signaling, the waveform configuration manager 825 may be configured as or otherwise support a means for receiving the control signaling, where the first wireless device is a network entity and the second wireless device is a UE.

Figure 9:
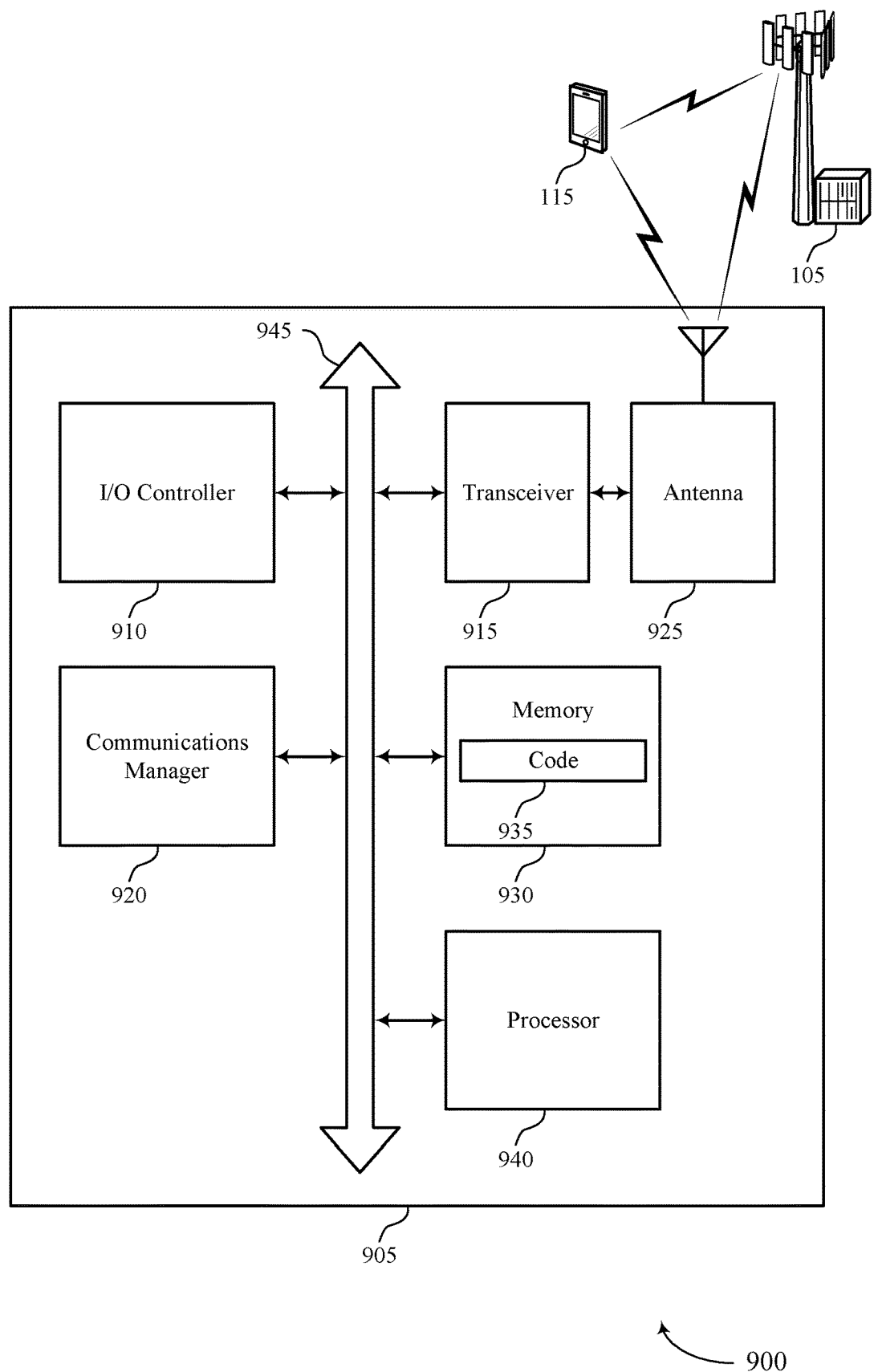
FIG. 9 illustrates a diagram of a system including a UE that supports techniques for CP compatible formulation of single carrier waveforms in accordance with one or more aspects of the present disclosure.

FIG. 9 illustrates a diagram of a system 900 including a device 905 that supports techniques for CP compatible formulation of single carrier waveforms in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for CP compatible formulation of single carrier waveforms). For example, the device 905 or a component of the device 905 may include a processor 940 and memory 930 coupled with or to the processor 940, the processor 940 and memory 930 configured to perform various functions described herein.

The communications manager 920 may support wireless communications at a first wireless device in accordance with examples as disclosed herein. For example, the communications manager 920 may be configured as or otherwise support a means for communicating, with a second wireless device, control signaling indicating a single carrier waveform configuration associated with a transmission, the single carrier waveform configuration indicating a set of parameters including at least one of a single carrier waveform type, a differential encoding type, a bandwidth expansion factor, a frequency shaping filter, a quantity of symbols, and a quantity of subcarriers. The communications manager 920 may be configured as or otherwise support a means for performing differential encoding on a set of data samples associated with the single carrier waveform type. The communications manager 920 may be configured as or otherwise support a means for performing a FFT on a set of data samples associated with the single carrier waveform type to generate a first output, a size of the FFT associated with the quantity of symbols, the single carrier waveform type may include a SC-QAM waveform type, an MSK waveform type, a GMSK waveform type, or a CPM waveform type. The communications manager 920 may be configured as or otherwise support a means for performing bandwidth expansion in accordance with the bandwidth expansion factor and a spectrum shaping in accordance with the frequency shaping filter on the first output of the FFT to generate a second output. The communications manager 920 may be configured as or otherwise support a means for performing an IFFT on the second output to generate a waveform, a size of the IFFT associated with the quantity of subcarriers. The communications manager 920 may be configured as or otherwise support a means for transmitting, to the second wireless device, the transmission including the generated waveform.

Additionally, or alternatively, the communications manager 920 may support wireless communications at a second wireless device in accordance with examples as disclosed herein. For example, the communications manager 920 may be configured as or otherwise support a means for communicating, with a first wireless device, control signaling indicating a single carrier waveform configuration associated with a transmission, the single carrier waveform configuration indicating a set of parameters including at least one of a single carrier waveform type, a bandwidth expansion factor, a frequency shaping filter, a quantity of symbols, and a quantity of subcarriers, the single carrier waveform type may include a SC-QAM waveform type, an MSK waveform type, a GMSK waveform type, or a CPM waveform type. The communications manager 920 may be configured as or otherwise support a means for receiving, from the first wireless device via the quantity of symbols and the quantity of subcarriers, the transmission including a waveform. The communications manager 920 may be configured as or otherwise support a means for decoding the waveform in accordance with the bandwidth expansion factor and the frequency shaping filter to identify a set of data samples associated with a single carrier waveform type.

By including or configuring the communications manager 920 in accordance with examples as described herein, the device 905 may support techniques for improved communication reliability, reduced power consumption, more efficient utilization of communication resources, improved coordination between devices, longer battery life, improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for CP compatible formulation of single carrier waveforms as described herein, or the processor 940 and the memory 930 may be otherwise configured to perform or support such operations.

Figure 10:
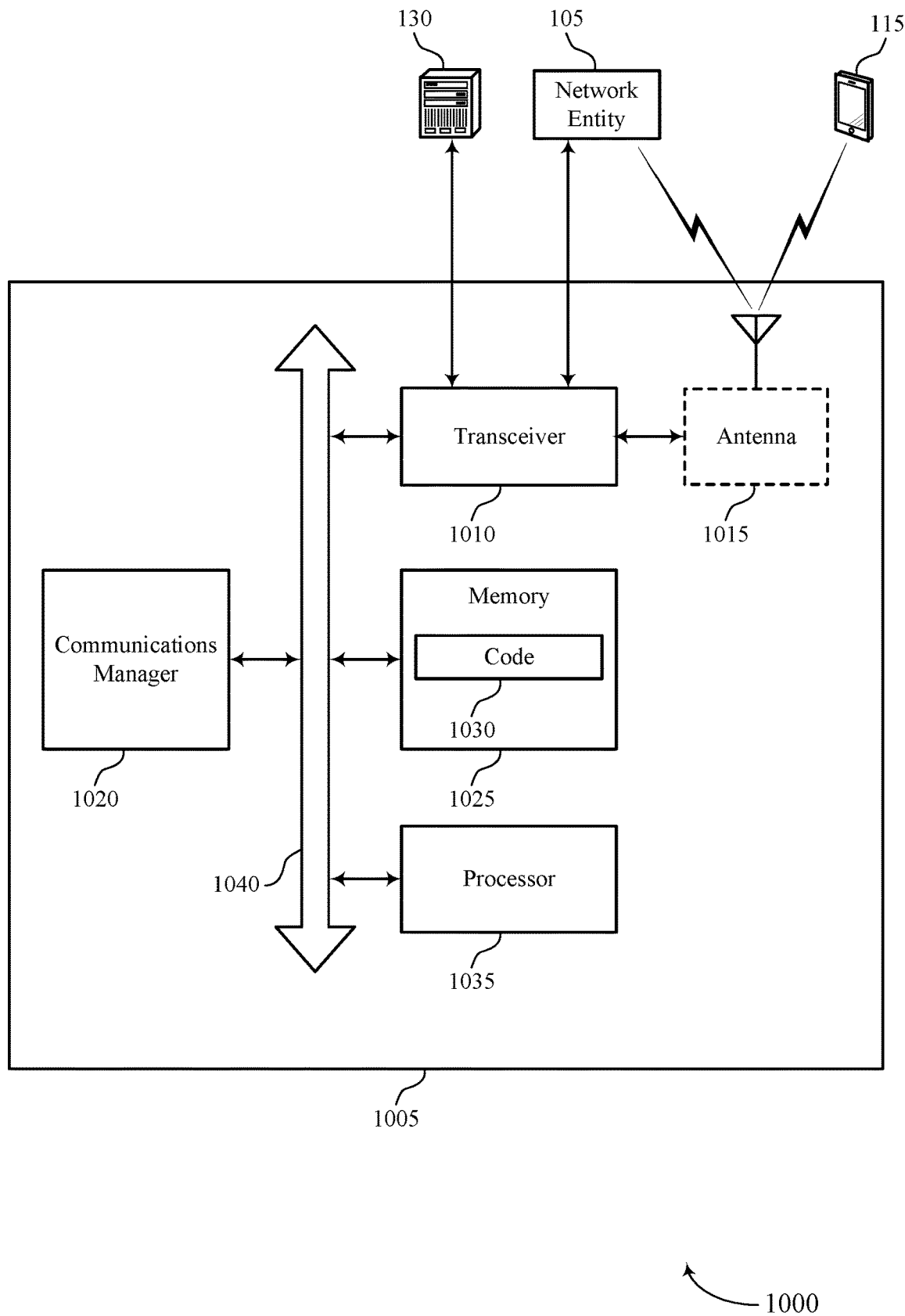
FIG. 10 illustrates a diagram of a system including a network entity that supports techniques for CP compatible formulation of single carrier waveforms in accordance with one or more aspects of the present disclosure.

FIG. 10 illustrates a diagram of a system 1000 including a device 1005 that supports techniques for CP compatible formulation of single carrier waveforms in accordance with one or more aspects of the present disclosure. The device 1005 may be an example of or include the components of a device 605, a device 705, or a network entity 105 as described herein. The device 1005 may communicate with one or more network entities 105, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, a memory 1025, code 1030, and a processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. In some implementations, the transceiver 1010 may include one or more interfaces, such as one or more interfaces coupled with the one or more antennas 1015 that are configured to support various receiving or obtaining operations, or one or more interfaces coupled with the one or more antennas 1015 that are configured to support various transmitting or outputting operations, or a combination thereof. In some implementations, the transceiver 1010 may include or be configured for coupling with one or more processors or memory components that are operable to perform or support operations based on received or obtained information or signals, or to generate information or other signals for transmission or other outputting, or any combination thereof. In some implementations, the transceiver 1010, or the transceiver 1010 and the one or more antennas 1015, or the transceiver 1010 and the one or more antennas 1015 and one or more processors or memory components (for example, the processor 1035, or the memory 1025, or both), may be included in a chip or chip assembly that is installed in the device 1005. In some examples, the transceiver may be operable to support communications via one or more communications links (e.g., a communication link 125, a backhaul communication link 120, a midhaul communication link 162, a fronthaul communication link 168).

The memory 1025 may include RAM and ROM. The memory 1025 may store computer-readable, computer-executable code 1030 including instructions that, when executed by the processor 1035, cause the device 1005 to perform various functions described herein. The code 1030 may be stored in a non-transitory computer-readable medium such as system memory or another type of memory. In some cases, the code 1030 may not be directly executable by the processor 1035 but may cause a computer (e.g., when compiled and executed) to perform functions described herein. In some cases, the memory 1025 may contain, among other things, a BIOS which may control basic hardware or software operation such as the interaction with peripheral components or devices.

The processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1035 may be configured to operate a memory array using a memory controller. In some other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting techniques for CP compatible formulation of single carrier waveforms). For example, the device 1005 or a component of the device 1005 may include a processor 1035 and memory 1025 coupled with the processor 1035, the processor 1035 and memory 1025 configured to perform various functions described herein. The processor 1035 may be an example of a cloud-computing platform (e.g., one or more physical nodes and supporting software such as operating systems, virtual machines, or container instances) that may host the functions (e.g., by executing code 1030) to perform the functions of the device 1005. The processor 1035 may be any one or more suitable processors capable of executing scripts or instructions of one or more software programs stored in the device 1005 (such as within the memory 1025). In some implementations, the processor 1035 may be a component of a processing system. A processing system may generally refer to a system or series of machines or components that receives inputs and processes the inputs to produce a set of outputs (which may be passed to other systems or components of, for example, the device 1005). For example, a processing system of the device 1005 may refer to a system including the various other components or subcomponents of the device 1005, such as the processor 1035, or the transceiver 1010, or the communications manager 1020, or other components or combinations of components of the device 1005. The processing system of the device 1005 may interface with other components of the device 1005, and may process information received from other components (such as inputs or signals) or output information to other components. For example, a chip or modem of the device 1005 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1005 may transmit information output from the chip or modem. Additionally, or alternatively, in some implementations, the one or more interfaces may refer to an interface between the processing system of the chip or modem and a receiver, such that the device 1005 may obtain information or signal inputs, and the information may be passed to the processing system. A person having ordinary skill in the art will readily recognize that a first interface also may obtain information or signal inputs, and a second interface also may output information or signal outputs.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the memory 1025, the code 1030, and the processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, the communications manager 1020 may manage communications with other network entities 105, and may include a controller or scheduler for controlling communications with UEs 115 in cooperation with other network entities 105. In some examples, the communications manager 1020 may support an X2 interface within an LTE/LTE-A wireless communications network technology to provide communication between network entities 105.

The communications manager 1020 may support wireless communications at a first wireless device in accordance with examples as disclosed herein. For example, the communications manager 1020 may be configured as or otherwise support a means for communicating, with a second wireless device, control signaling indicating a single carrier waveform configuration associated with a transmission, the single carrier waveform configuration indicating a set of parameters including at least one of a single carrier waveform type, a differential encoding type, a bandwidth expansion factor, a frequency shaping filter, a quantity of symbols, and a quantity of subcarriers. The communications manager 1020 may be configured as or otherwise support a means for performing differential encoding on a set of data samples associated with the single carrier waveform type. The communications manager 1020 may be configured as or otherwise support a means for performing a FFT on a set of data samples associated with the single carrier waveform type to generate a first output, a size of the FFT associated with the quantity of symbols, the single carrier waveform type may include a SC-QAM waveform type, an MSK waveform type, a GMSK waveform type, or a CPM waveform type. The communications manager 1020 may be configured as or otherwise support a means for performing bandwidth expansion in accordance with the bandwidth expansion factor and a spectrum shaping in accordance with the frequency shaping filter on the first output of the FFT to generate a second output. The communications manager 1020 may be configured as or otherwise support a means for performing an IFFT on the second output to generate a waveform, a size of the IFFT associated with the quantity of subcarriers. The communications manager 1020 may be configured as or otherwise support a means for transmitting, to the second wireless device, the transmission including the generated waveform.

Additionally, or alternatively, the communications manager 1020 may support wireless communications at a second wireless device in accordance with examples as disclosed herein. For example, the communications manager 1020 may be configured as or otherwise support a means for communicating, with a first wireless device, control signaling indicating a single carrier waveform configuration associated with a transmission, the single carrier waveform configuration indicating a set of parameters including at least one of a single carrier waveform type, a bandwidth expansion factor, a frequency shaping filter, a quantity of symbols, and a quantity of subcarriers, the single carrier waveform type may include a SC-QAM waveform type, an MSK waveform type, a GMSK waveform type, or a CPM waveform type. The communications manager 1020 may be configured as or otherwise support a means for receiving, from the first wireless device via the quantity of symbols and the quantity of subcarriers, the transmission including a waveform. The communications manager 1020 may be configured as or otherwise support a means for decoding the waveform in accordance with the bandwidth expansion factor and the frequency shaping filter to identify a set of data samples associated with the single carrier waveform type.

By including or configuring the communications manager 1020 in accordance with examples as described herein, the device 1005 may support techniques for improved communication reliability, reduced power consumption, more efficient utilization of communication resources, improved coordination between devices, longer battery life, improved utilization of processing capability.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the transceiver 1010, the processor 1035, the memory 1025, the code 1030, or any combination thereof. For example, the code 1030 may include instructions executable by the processor 1035 to cause the device 1005 to perform various aspects of techniques for CP compatible formulation of single carrier waveforms as described herein, or the processor 1035 and the memory 1025 may be otherwise configured to perform or support such operations.

Figure 11:
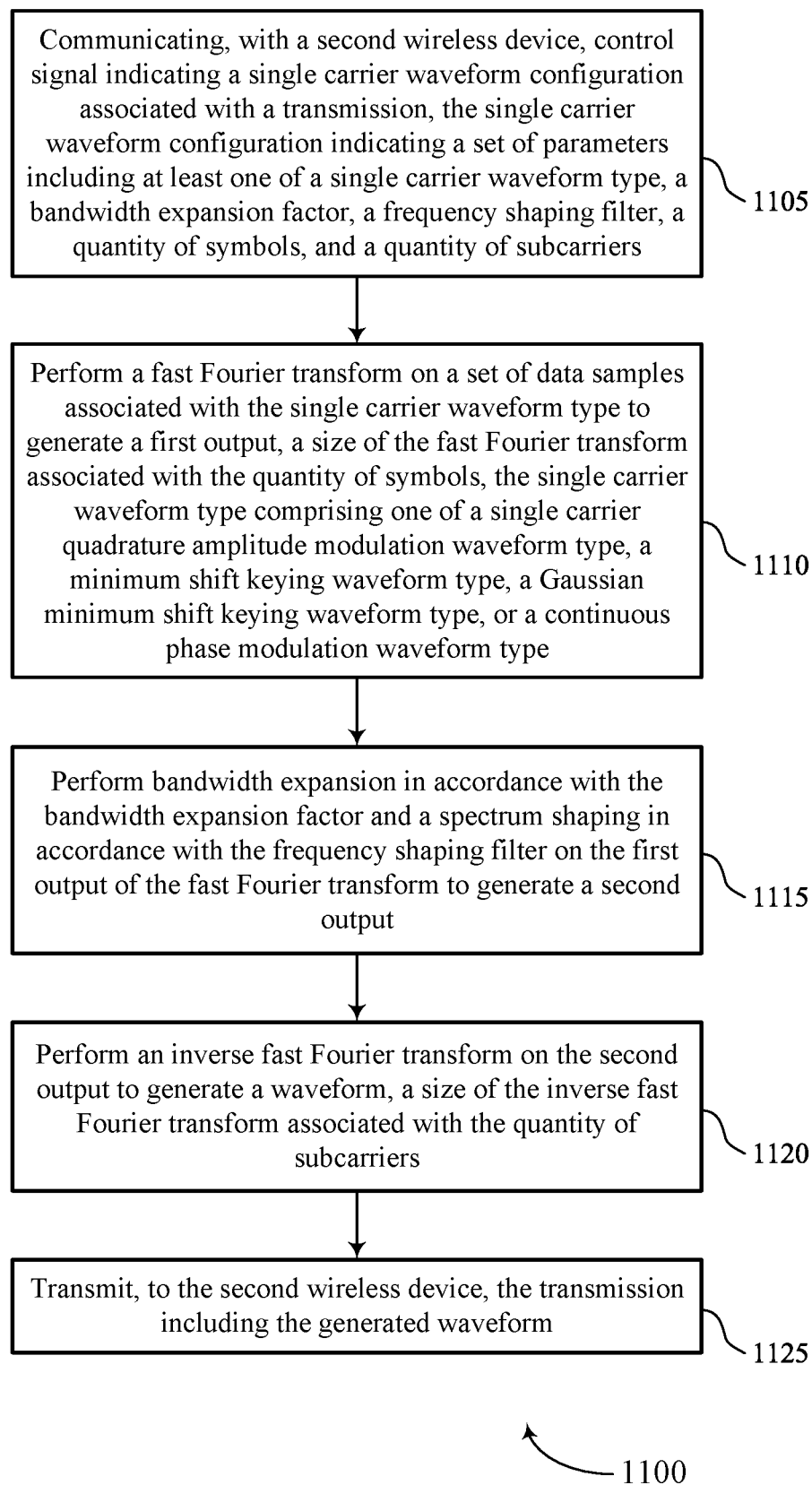

FIG. 11 illustrates a flowchart illustrating a method 1100 that supports techniques for CP compatible formulation of single carrier waveforms in accordance with one or more aspects of the present disclosure. The operations of the method 1100 may be implemented by a UE or a network entity or its components as described herein. For example, the operations of the method 1100 may be performed by a UE 115 or a network entity as described with reference to FIGS. 1 through 10. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1105, the method may include communicating, with a second wireless device, control signaling indicating a single carrier waveform configuration associated with a transmission, the single carrier waveform configuration indicating a set of parameters including at least one of a single carrier waveform type a bandwidth expansion factor, a frequency shaping filter, a quantity of symbols, and a quantity of subcarriers. The operations of 1105 may be performed in accordance with examples as disclosed herein. In some examples, aspects of the operations of 1105 may be performed by a waveform configuration manager 825 as described with reference to FIG. 8.

At 1110, the method may include performing a FFT on a set of data samples associated with a single carrier waveform type to generate a first output, a size of the FFT associated with the quantity of symbols, the single carrier waveform type may include a SC-QAM waveform type, an MSK waveform type, a GMSK waveform type, or a CPM waveform type. The operations of 1110 may be performed in accordance with examples as disclosed herein. In some examples, aspects of the operations of 1110 may be performed by a FFT manager 830 as described with reference to FIG. 8.

At 1115, the method may include performing bandwidth expansion in accordance with the bandwidth expansion factor and a spectrum shaping in accordance with the frequency shaping filter on the first output of the FFT to generate a second output. The operations of 1115 may be performed in accordance with examples as disclosed herein. In some examples, aspects of the operations of 1115 may be performed by a bandwidth expansion manager 835 as described with reference to FIG. 8.

At 1120, the method may include performing an IFFT on the second output to generate a waveform, a size of the IFFT associated with the quantity of subcarriers. The operations of 1120 may be performed in accordance with examples as disclosed herein. In some examples, aspects of the operations of 1120 may be performed by an IFFT manager 840 as described with reference to FIG. 8.

At 1125, the method may include transmitting, to the second wireless device, the transmission including the generated waveform. The operations of 1125 may be performed in accordance with examples as disclosed herein. In some examples, aspects of the operations of 1125 may be performed by a waveform transmission manager 845 as described with reference to FIG. 8.

FIG. 12 illustrates a flowchart illustrating a method 1200 that supports techniques for CP compatible formulation of single carrier waveforms in accordance with one or more aspects of the present disclosure. The operations of the method 1200 may be implemented by a UE or a network entity or its components as described herein. For example, the operations of the method 1200 may be performed by a UE 115 or a network entity as described with reference to FIGS. 1 through 10. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1205, the method may include communicating, with a first wireless device, control signaling indicating a single carrier waveform configuration associated with a transmission, the single carrier waveform configuration indicating a set of parameters including at least one of a single carrier waveform type, a bandwidth expansion factor, a frequency shaping filter, a quantity of symbols, and a quantity of subcarriers, the single carrier waveform type may include a SC-QAM waveform type, an MSK waveform type, a GMSK waveform type, or a CPM waveform type. The operations of 1205 may be performed in accordance with examples as disclosed herein. In some examples, aspects of the operations of 1205 may be performed by a waveform configuration manager 825 as described with reference to FIG. 8.

At 1210, the method may include receiving, from the first wireless device via the quantity of symbols and the quantity of subcarriers, the transmission including a waveform. The operations of 1210 may be performed in accordance with examples as disclosed herein. In some examples, aspects of the operations of 1210 may be performed by a waveform transmission manager 845 as described with reference to FIG. 8.

At 1215, the method may include decoding the waveform in accordance with the bandwidth expansion factor and the frequency shaping filter to identify a set of data samples associated with a single carrier waveform type. The operations of 1215 may be performed in accordance with examples as disclosed herein. In some examples, aspects of the operations of 1215 may be performed by a waveform decoding manager 850 as described with reference to FIG. 8.

The following provides an overview of aspects of the present disclosure:

Aspect 1: A method for wireless communications at a first wireless device, comprising: communicating, with a second wireless device, control signaling indicating a single carrier waveform configuration associated with a transmission, the single carrier waveform configuration indicating a set of parameters comprising at least one of a single carrier waveform type, a bandwidth expansion factor, a frequency shaping filter, a quantity of symbols, and a quantity of subcarriers; performing a FFT on a set of data samples associated with the single carrier waveform type to generate a first output, a size of the FFT associated with the quantity of symbols, the single carrier waveform type comprising one of a SC-QAM waveform type, a MSK waveform type, a GMSK waveform type, or a CPM waveform type; performing bandwidth expansion in accordance with the bandwidth expansion factor and a spectrum shaping in accordance with the frequency shaping filter on the first output of the FFT to generate a second output; and performing an IFFT on the second output to generate a waveform, a size of the IFFT associated with the quantity of subcarriers; and transmitting, to the second wireless device, the transmission comprising the generated waveform.

Aspect 2: The method of aspect 1, further comprising: communicating, with the second wireless device, control information indicating a CP length, a subcarrier spacing, a symbol length in time and a sampling rate associated with the transmission, wherein the waveform is generated in accordance with the CP length, the subcarrier spacing, the symbol length and the sampling rate.

Aspect 3: The method of aspect 2, wherein communicating the control information comprises: communicating second control signaling indicating the CP length, the subcarrier spacing, and the sampling rate are associated with a bandwidth part or a component carrier, wherein the transmission is associated with the bandwidth part or the component carrier.

Aspect 4: The method of aspect 2, wherein communicating the control information comprises: communicating the control information in a same control message as the control signaling indicating the single carrier waveform configuration.

Aspect 5: The method of any of aspects 2 through 4, further comprising: appending a CP having the CP length to each symbol of a third output of the IFFT to generate the waveform.

Aspect 6: The method of any of aspects 1 through 5, wherein communicating the control signaling comprises: communicating an indication of the single carrier waveform type from a set of single carrier waveform types, wherein the bandwidth expansion factor and the frequency shaping filter are based at least in part on the single carrier waveform type.

Aspect 7: The method of aspect 6, wherein the set of single carrier waveform types comprises two or more of a DFT-s-OFDM waveform type, the SC-QAM waveform type, the MSK waveform type, the GMSK waveform type, or the CPM waveform type.

Aspect 8: The method of any of aspects 1 through 7, further comprising: generating the set of data samples via performing differential encoding on a data stream in accordance with a memory parameter, a modulation index parameter and a modulation order parameter, wherein the single carrier waveform type comprises the CPM waveform type, wherein the waveform configuration indicates the memory parameter, the modulation index parameter and the modulation order parameter.

Aspect 9: The method of any of aspects 1 through 8, wherein communicating the control signaling comprises: receiving the control signaling, wherein the first wireless device is a UE and the second wireless device is a network entity.

Aspect 10: The method of any of aspects 1 through 8, wherein communicating the control signaling comprises: transmitting the control signaling, wherein the first wireless device is a network entity and the second wireless device is a UE.

Aspect 11: A method for wireless communications at a second wireless device, comprising: communicating, with a first wireless device, control signaling indicating a single carrier waveform configuration associated with a transmission, the single carrier waveform configuration indicating a set of parameters comprising at least one of a bandwidth expansion factor, a frequency shaping filter, a quantity of symbols, and a quantity of subcarriers, the single carrier waveform type comprising one of a SC-QAM waveform type, a MSK waveform type, a GMSK waveform type, or a CPM waveform type; receiving, from the first wireless device via the quantity of symbols and the quantity of subcarriers, the transmission comprising a waveform; and decoding the waveform in accordance with the bandwidth expansion factor and the frequency shaping filter to identify a set of data samples associated with the single carrier waveform type.

Aspect 12: The method of aspect 11, further comprising: communicating, with the first wireless device, control information indicating a CP length, a subcarrier spacing, a symbol length in time and a sampling rate associated with the transmission, wherein decoding the waveform comprises decoding the waveform in accordance with the CP length, the subcarrier spacing, the symbol length and the sampling rate.

Aspect 13: The method of aspect 12, wherein communicating the control information comprises: communicating second control signaling indicating the CP length, the subcarrier spacing, and the sampling rate are associated with a bandwidth part or a component carrier, wherein the transmission is associated with the bandwidth part or the component carrier.

Aspect 14: The method of aspect 12, wherein communicating the control information comprises: communicating the control information in a same control message as the control signaling indicating the single carrier waveform configuration.

Aspect 15: The method of any of aspects 12 through 14, wherein decoding the waveform in accordance with the CP length comprises: removing a CP having the CP length from each symbol of the waveform.

Aspect 16: The method of any of aspects 11 through 15, wherein communicating the control signaling comprises: communicating an indication of the single carrier waveform type from a set of single carrier waveform types, wherein the bandwidth expansion factor and the frequency shaping filter are based at least in part on the single carrier waveform type.

Aspect 17: The method of aspect 16, wherein the set of single carrier waveform types comprises two or more of a DFT-s-OFDM waveform type, the SC-QAM waveform type, the MSK waveform type, the GMSK waveform type, or the CPM waveform type.

Aspect 18: The method of any of aspects 11 through 17, wherein decoding the waveform to identify the set of data samples comprises: decoding the waveform in accordance with a memory parameter and a modulation order parameter, wherein the single carrier waveform type comprises the CPM waveform type, wherein the single carrier waveform configuration indicates the memory parameter and the modulation order parameter.

Aspect 19: The method of any of aspects 11 through 18, wherein communicating the control signaling comprises: transmitting the control signaling, wherein the first wireless device is a UE and the second wireless device is a network entity.

Aspect 20: The method of any of aspects 11 through 18, wherein communicating the control signaling comprises: receiving the control signaling, wherein the first wireless device is a network entity and the second wireless device is a UE.

Aspect 21: An apparatus for wireless communications at a first wireless device, comprising a processor; memory coupled with the processor; and instructions stored in the memory and executable by the processor to cause the apparatus to perform a method of any of aspects 1 through 10.

Aspect 22: An apparatus for wireless communications at a first wireless device, comprising at least one means for performing a method of any of aspects 1 through 10.

Aspect 23: A non-transitory computer-readable medium storing code for wireless communications at a first wireless device, the code comprising instructions executable by a processor to perform a method of any of aspects 1 through 10.

Aspect 24: An apparatus for wireless communications at a second wireless device, comprising a processor; memory coupled with the processor; and instructions stored in the memory and executable by the processor to cause the apparatus to perform a method of any of aspects 11 through 20.

Aspect 25: An apparatus for wireless communications at a second wireless device, comprising at least one means for performing a method of any of aspects 11 through 20.

Aspect 26: A non-transitory computer-readable medium storing code for wireless communications at a second wireless device, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
    communicating, with a second wireless device, control signaling indicating a single carrier waveform configuration associated with a transmission, the single carrier waveform configuration indicating a set of parameters comprising at least one of a single carrier waveform type, a bandwidth expansion factor, a frequency shaping filter, a quantity of symbols, and a quantity of subcarriers;
    communicating, with the second wireless device, control information indicating a cyclic prefix length, a subcarrier spacing, a symbol length in time and a sampling rate associated with the transmission;
    performing a fast Fourier transform on a set of data samples associated with the single carrier waveform type to generate a first output, a size of the fast Fourier transform associated with the quantity of symbols, the single carrier waveform type comprising one of a single carrier quadrature amplitude modulation waveform type, a minimum shift keying waveform type, a Gaussian minimum shift keying waveform type, or a continuous phase modulation waveform type;
    performing bandwidth expansion in accordance with the bandwidth expansion factor and a spectrum shaping in accordance with the frequency shaping filter on the first output of the fast Fourier transform to generate a second output;
    performing an inverse fast Fourier transform on the second output, a size of the inverse fast Fourier transform associated with the quantity of subcarriers;
    appending a cyclic prefix having the cyclic prefix length to each symbol of a third output of the inverse fast Fourier transform to generate the waveform, wherein the waveform is generated in accordance with the cyclic prefix length, the subcarrier spacing, the symbol length and the sampling rate; and
    transmitting, to the second wireless device, the transmission comprising the generated waveform.

2. The method of claim 1, wherein communicating the control information comprises:
    communicating second control signaling indicating the cyclic prefix length, the subcarrier spacing, and the sampling rate are associated with a bandwidth part or a component carrier, wherein the transmission is associated with the bandwidth part or the component carrier.

3. The method of claim 1, wherein communicating the control information comprises:
    communicating the control information in a same control message as the control signaling indicating the single carrier waveform configuration.

4. The method of claim 1, wherein communicating the control signaling comprises:
    communicating an indication of the single carrier waveform type from a set of single carrier waveform types, wherein the bandwidth expansion factor and the frequency shaping filter are based at least in part on the single carrier waveform type.

5. The method of claim 4, wherein the set of single carrier waveform types comprises two or more of a discrete Fourier transform spread orthogonal frequency division multiplexing waveform type, the single carrier quadrature amplitude modulation waveform type, the minimum shift keying waveform type, the Gaussian minimum shift keying waveform type, or the continuous phase modulation waveform type.

6. The method of claim 1, further comprising:
    generating the set of data samples via performing differential encoding on a data stream in accordance with a memory parameter, a modulation index parameter and a modulation order parameter, wherein the single carrier waveform type comprises the continuous phase modulation waveform type, wherein the single carrier waveform configuration indicates the memory parameter, the modulation index parameter and the modulation order parameter.

7. The method of claim 1, wherein communicating the control signaling comprises:
    receiving the control signaling, wherein the first wireless device is a user equipment (UE) and the second wireless device is a network entity.

8. The method of claim 1, wherein communicating the control signaling comprises:
    transmitting the control signaling, wherein the first wireless device is a network entity and the second wireless device is a user equipment (UE).

9. A method for wireless communications at a second wireless device, comprising:
    communicating, with a first wireless device, control signaling indicating a single carrier waveform configuration associated with a transmission, the single carrier waveform configuration indicating a set of parameters comprising at least one of a single carrier waveform type, a bandwidth expansion factor, a frequency shaping filter, a quantity of symbols, and a quantity of subcarriers, the single carrier waveform type comprising one of a single carrier quadrature amplitude modulation waveform type, a minimum shift keying waveform type, a Gaussian minimum shift keying waveform type, or a continuous phase modulation waveform type;
    communicating, with the first wireless device, control information indicating a cyclic prefix length, a subcarrier spacing, a symbol length in time and a sampling rate associated with the transmission;

receiving, from the first wireless device via the quantity of symbols and the quantity of subcarriers, the transmission comprising a waveform; and decoding the waveform in accordance with the bandwidth expansion factor and the frequency shaping filter to identify a set of data samples associated with the single carrier waveform type, wherein decoding the waveform comprises decoding the waveform in accordance with the cyclic prefix length, the subcarrier spacing, the symbol length and the sampling rate, wherein decoding the waveform in accordance with the cyclic prefix length comprises removing a cyclic prefix having the cyclic prefix length from each symbol of the waveform.

10. The method of claim 9, wherein communicating the control information comprises:

communicating second control signaling indicating the cyclic prefix length, the subcarrier spacing, and the sampling rate are associated with a bandwidth part or a component carrier, wherein the transmission is associated with the bandwidth part or the component carrier.

11. The method of claim 9, wherein communicating the control information comprises:

communicating the control information in a same control message as the control signaling indicating the single carrier waveform configuration.

12. The method of claim 9, wherein communicating the control signaling comprises:

communicating an indication of the single carrier waveform type from a set of single carrier waveform types, wherein the bandwidth expansion factor and the frequency shaping filter are based at least in part on the single carrier waveform type.

13. The method of claim 12, wherein the set of single carrier waveform types comprises two or more of a discrete Fourier transform spread orthogonal frequency division multiplexing waveform type, the single carrier quadrature amplitude modulation waveform type, the minimum shift keying waveform type, the Gaussian minimum shift keying waveform type, or the continuous phase modulation waveform type.

14. The method of claim 9, wherein decoding the waveform to identify the set of data samples comprises:

decoding the waveform in accordance with a memory parameter and a modulation order parameter, wherein the single carrier waveform type comprises the continuous phase modulation waveform type, wherein the single carrier waveform configuration indicates the memory parameter and the modulation order parameter.

15. The method of claim 9, wherein communicating the control signaling comprises:

transmitting the control signaling, wherein the first wireless device is a user equipment (UE) and the second wireless device is a network entity.

16. The method of claim 9, wherein communicating the control signaling comprises:

receiving the control signaling, wherein the first wireless device is a network entity and the second wireless device is a user equipment (UE).

17. An apparatus for wireless communications at a first wireless device, comprising:

a processing system that includes one or more processors and one or more code-storing memories coupled with the one or more processors, the processing system configured to cause the first wireless device to:

communicate, with a second wireless device, control signaling indicating a single carrier waveform configuration associated with a transmission, the single carrier waveform configuration indicating a set of parameters comprising at least one of a single carrier waveform type, a bandwidth expansion factor, a frequency shaping filter, a quantity of symbols, and a quantity of subcarriers;

communicate, with the second wireless device, control information indicating a cyclic prefix length, a subcarrier spacing, a symbol length in time and a sampling rate associated with the transmission;

perform a fast Fourier transform on a set of data samples associated with the single carrier waveform type to generate a first output, a size of the fast Fourier transform associated with the quantity of symbols, the single carrier waveform type comprising one of a single carrier quadrature amplitude modulation waveform type, a minimum shift keying waveform type, a Gaussian minimum shift keying waveform type, or a continuous phase modulation waveform type;

perform bandwidth expansion in accordance with the bandwidth expansion factor and a spectrum shaping in accordance with the frequency shaping filter on the first output of the fast Fourier transform to generate a second output;

perform an inverse fast Fourier transform on the second, a size of the inverse fast Fourier transform associated with the quantity of subcarriers;

append a cyclic prefix having the cyclic prefix length to each symbol of a third output of the inverse fast Fourier transform to generate the waveform, wherein the waveform is generated in accordance with the cyclic prefix length, the subcarrier spacing, the symbol length and the sampling rate; and transmit, to the second wireless device, the transmission comprising the generated waveform.

18. The apparatus of claim 17, wherein the processing system, to cause the first wireless device to communicate the control information, is configured to cause the first wireless device to:

communicate second control signaling indicating the cyclic prefix length, the subcarrier spacing, and the sampling rate are associated with a bandwidth part or a component carrier, wherein the transmission is associated with the bandwidth part or the component carrier.

19. The apparatus of claim 17, wherein the processing system, to cause the first wireless device to communicate the control information, is configured to cause the first wireless device to:

communicate the control information in a same control message as the control signaling indicating the single carrier waveform configuration.

20. The apparatus of claim 17, wherein the processing system, to cause the first wireless device to communicate the control signaling, is configured to cause the first wireless device to:

communicate an indication of the single carrier waveform type from a set of single carrier waveform types, wherein the bandwidth expansion factor and the frequency shaping filter are based at least in part on the single carrier waveform type.

21. The apparatus of claim 20, wherein the set of single carrier waveform types comprises two or more of a discrete Fourier transform spread orthogonal frequency division multiplexing waveform type, the single carrier quadrature amplitude modulation waveform type, the minimum shift keying waveform type, the Gaussian minimum shift keying waveform type, or the continuous phase modulation waveform type.

22. The apparatus of claim 17, wherein the processing system is further configured to cause the first wireless device to:
generate the set of data samples via performing differential encoding on a data stream in accordance with a memory parameter, a modulation index parameter and a modulation order parameter, wherein the single carrier waveform type comprises the continuous phase modulation waveform type, wherein the single carrier waveform configuration indicates the memory parameter and the modulation order parameter.

23. The apparatus of claim 17, wherein the processing system, to cause the first wireless device to communicate the control signaling, is configured to cause the first wireless device to:
receive the control signaling, wherein the first wireless device is a user equipment (UE) and the second wireless device is a network entity.

24. The apparatus of claim 17, wherein the processing system, to cause the first wireless device to communicate the control signaling, is configured to cause the first wireless device to:
transmit the control signaling, wherein the first wireless device is a network entity and the second wireless device is a user equipment (UE).

25. An apparatus for wireless communications at a second wireless device, comprising:
a processing system that includes one or more processors and one or more code-storing memories coupled with the one or more processors, the processing system configured to cause the second wireless device to:
communicate, with a first wireless device, control signaling indicating a single carrier waveform configuration associated with a transmission, the single carrier waveform configuration indicating a set of parameters comprising at least one of a single carrier waveform type, a bandwidth expansion factor, a frequency shaping filter, a quantity of symbols, and a quantity of subcarriers, the single carrier waveform type comprising one of a single carrier quadrature amplitude modulation waveform type, a minimum shift keying waveform type, a Gaussian minimum shift keying waveform type, or a continuous phase modulation waveform type;
communicate, with the first wireless device, control information indicate a cyclic prefix length, a subcarrier spacing, a symbol length in time and a sampling rate associated with the transmission;
receive, from the first wireless device via the quantity of symbols and the quantity of subcarriers, the transmission comprising a waveform; and
decode the waveform in accordance with the bandwidth expansion factor and the frequency shaping filter to identify a set of data samples associated with the single carrier waveform type, wherein decoding the waveform comprises decoding the waveform in accordance with the cyclic prefix length, the subcarrier spacing, the symbol length and the sampling rate, wherein decoding the waveform in accordance with the cyclic prefix length comprises removing a cyclic prefix having the cyclic prefix length from each symbol of the waveform.

26. The apparatus of claim 25, wherein the processing system, to cause the second wireless device to communicate the control information, is configured to cause the second wireless device to:
communicate second control signaling indicating the cyclic prefix length, the subcarrier spacing, and the sampling rate are associated with a bandwidth part or a component carrier, wherein the transmission is associated with the bandwidth part or the component carrier.

27. The apparatus of claim 25, wherein the processing system, to cause the second wireless device to communicate the control information, is configured to cause the second wireless device to:
communicate the control information in a same control message as the control signaling indicating the single carrier waveform configuration.

28. The apparatus of claim 25, wherein the processing system, to cause the second wireless device to communicate the control signaling, is configured to cause the second wireless device to:
communicate an indication of the single carrier waveform type from a set of single carrier waveform types, wherein the bandwidth expansion factor and the frequency shaping filter are based at least in part on the single carrier waveform type.

29. The apparatus of claim 28, wherein the set of single carrier waveform types comprises two or more of a discrete Fourier transform spread orthogonal frequency division multiplexing waveform type, a single carrier quadrature amplitude modulation waveform type, a minimum shift keying waveform type, a Gaussian minimum shift keying waveform type, or a continuous phase modulation waveform type.

30. The apparatus of claim 25, wherein the processing system, to cause the second wireless device to decode the waveform to identify the set of data samples, is configured to cause the second wireless device to:
decode the waveform in accordance with a memory parameter, a modulation index parameter and a modulation order parameter, wherein the single carrier waveform type comprises a continuous phase modulation waveform type, wherein the single carrier waveform configuration indicates the memory parameter and the modulation order parameter.

31. The apparatus of claim 25, wherein the processing system, to cause the second wireless device to communicate the control signaling, is configured to cause the second wireless device to:
transmit the control signaling, wherein the first wireless device is a user equipment (UE) and the second wireless device is a network entity.

32. The apparatus of claim 25, wherein the processing system, to cause the second wireless device to communicate the control signaling, is configured to cause the second wireless device to:
receive the control signaling, wherein the first wireless device is a network entity and the second wireless device is a user equipment (UE).

* * * * *